(12) United States Patent
Green et al.

(10) Patent No.: US 9,070,275 B1
(45) Date of Patent: Jun. 30, 2015

(54) MOBILE ENTITY TRACKING AND ANALYSIS SYSTEM

(71) Applicant: Gearn Holdings LLC, Tulsa, OK (US)

(72) Inventors: Shannon D. Green, Tulsa, OK (US); Tyler DeWitt, Tulsa, OK (US)

( * ) Notice: Subject to any disclaimer, the term of this patent is extended or adjusted under 35 U.S.C. 154(b) by 0 days.

(21) Appl. No.: 14/526,198

(22) Filed: Oct. 28, 2014

Related U.S. Application Data

(60) Provisional application No. 61/942,857, filed on Feb. 21, 2014.

(51) Int. Cl.
*G08B 1/08* (2006.01)
*G08B 21/18* (2006.01)
*G08B 21/12* (2006.01)

(52) U.S. Cl.
CPC .............. *G08B 21/182* (2013.01); *G08B 21/12* (2013.01)

(58) Field of Classification Search
CPC .............................. G08B 21/182; G08B 21/12
USPC ..................................................... 340/539.13
See application file for complete search history.

(56) References Cited

U.S. PATENT DOCUMENTS

| | | | |
|---|---|---|---|
| 5,305,238 A | 4/1994 | Starr, III et al. | |
| 6,198,394 B1 | 3/2001 | Jacobsen et al. | |
| 6,362,778 B2 | 3/2002 | Neher | |
| 6,963,301 B2 | 11/2005 | Schantz et al. | |
| 6,992,582 B2 | 1/2006 | Hill et al. | |
| 7,203,479 B2 | 4/2007 | Deeds | |
| 7,209,075 B2 | 4/2007 | Durst et al. | |
| 7,298,314 B2 | 11/2007 | Schantz et al. | |
| 7,307,595 B2 | 12/2007 | Schantz et al. | |
| 7,317,927 B2 | 1/2008 | Staton et al. | |
| 7,327,250 B2 | 2/2008 | Harvey | |
| 7,414,571 B2 | 8/2008 | Schantz et al. | |
| 7,538,715 B2 | 5/2009 | Langford et al. | |
| 7,592,949 B2 | 9/2009 | Schantz et al. | |
| 7,755,552 B2 | 7/2010 | Schantz et al. | |
| 7,859,452 B2 | 12/2010 | Schantz et al. | |
| 7,957,833 B2 | 6/2011 | Beucher et al. | |
| 8,018,383 B1 | 9/2011 | Schantz et al. | |
| 8,125,332 B2 | 2/2012 | Curran et al. | |
| 2005/0068169 A1* | 3/2005 | Copley et al. ............ 340/539.13 |
| 2007/0104173 A1 | 5/2007 | Drevon et al. | |
| 2008/0088437 A1* | 4/2008 | Aninye et al. ............ 340/539.13 |
| 2009/0131012 A1* | 5/2009 | Ashley et al. ............. 455/404.2 |
| 2009/0140851 A1* | 6/2009 | Graves et al. ............ 340/539.12 |
| 2013/0197859 A1 | 8/2013 | Albano et al. | |
| 2013/0212065 A1 | 8/2013 | Rahnama | |

FOREIGN PATENT DOCUMENTS

WO 2013/154764 A1 10/2013

\* cited by examiner

*Primary Examiner* — Kerri McNally
(74) *Attorney, Agent, or Firm* — Hall Estill Attorneys at Law

(57) ABSTRACT

Method and apparatus for mobile entity tracking and analysis. In some embodiments, a multi-dimensional geophysical area is divided into a first layer of zones. Each zone encompasses a contiguous portion of the geophysical area and has at least one rule assigned thereto. Geoposition values from a sensor attached to a mobile entity are accumulated in a memory, the geoposition values indicative of successive geopositions of the mobile entity. For each accumulated geoposition value, the associated zone in which the geoposition of the mobile entity is located is identified, and the at least one rule assigned to the zone is applied. A second layer zone is subsequently generated responsive to an input signal, and an alarm limit is output based on a subsequently accumulated geoposition value indicating the geoposition of the mobile entity is located within the second layer zone.

30 Claims, 12 Drawing Sheets

ZONE 3 RULES (CONFERENCE ROOM)

| |
|---|
| MAXIMUM NUMBER OF ALLOWED ENTITIES AT A TIME |
| ACCESS TIME INTERVALS |
| DURATION TIME INTERVALS |
| ENTITY CERTIFICATIONS REQUIRED |
| INTER-ENTITY DISTANCES |
| ENTITY MOVEMENT REQUIREMENTS |

MOBILE ENTITY TRACKING AND ANALYSIS SYSTEM

RELATED APPLICATIONS

The present application makes a claim of domestic priority under 35 U.S.C. §119(e) to U.S. Provisional Patent Application No. 61/942,857 filed Feb. 21, 2014, the contents of which are hereby incorporated by reference.

BACKGROUND

Tracking systems can be used to locate and monitor the positions of a wide variety of personnel and objects such as employees, customers, vehicles, animals, inventory, communication devices, etc. (collectively, "mobile entities"). Such systems often use position sensing mechanisms to track the positions of one or more mobile entities, such as but not limited to the United States Naystar Global Positioning System (GPS), wireless communication networks (e.g., smart phones, etc.), radio frequency (RF) transponders, mobile radios, motion detectors, proximity detectors, paging systems, etc.

Tracking systems can be used for a number of different purposes, such as inventory control, directional assistance, identifying and maintaining the locations of rescue personnel at an emergency site, monitoring a vehicle fleet, detecting the location of communication devices within a communication network, locating runaway pets, tracking stolen goods, and so on. While operable in identifying geoposition locations, tracking systems of the current art are deficient in a number of areas such as post-position determination analysis, reporting and corrective action capabilities.

SUMMARY

Various embodiments of the present disclosure are generally directed to an apparatus and method for mobile entity tracking and analysis.

In some embodiments, a multi-dimensional geophysical area is divided into a first layer of zones. Each zone encompasses a contiguous portion of the geophysical area and has at least one rule assigned thereto. Geoposition values from a sensor attached to a mobile entity are accumulated in a memory, the geoposition values indicative of successive geopositions of the mobile entity. For each accumulated geoposition value, the associated zone in which the geoposition of the mobile entity is located is identified, and the at least one rule assigned to the zone is applied. A second layer zone is subsequently generated responsive to an input signal, and an alarm limit is output based on a subsequently accumulated geoposition value indicating the geoposition of the mobile entity is located within the second layer zone.

In other embodiments, a plurality of sensors are provided, with each sensor being attached to a respective mobile entity within a geophysical area. A receiver receives a sequence of geoposition packets from each of the respective sensors indicative of instantaneous geoposition of the associated mobile entity. Each packet includes a set of geocoordinates and an associated timestamp indicative of a time at which the mobile entity was at the set of geocoordinates. A mapping engine defines, in a computer memory, a first layer of zones each corresponding to a different contiguous portion of the geophysical area, and at least one rule associated with the mobile entities for each zone. A sampling engine receives the transmitted packets from the receiver and generates an asynchronous frame as a set of received packets having timestamps within a selected time interval. A rules application engine operates to, for each frame, identify the associated zone in which each of the mobile entities is located, apply the associated rules for the associated frames, and set an alarm limit value in a memory responsive to a violation of at least one of the rules.

Other features and advantages of the various embodiments of the present disclosure can be understood from a review of the following detailed discussion and associated drawings.

DESCRIPTION OF DRAWINGS

FIG. 5-1 is a functional block diagram/flow diagram that generally describes the flow of data through the system of FIG. 1.

FIG. 5-2 shows example formats for various data structures used by the system of FIG. 5-1.

DETAILED DESCRIPTION

Generally, various embodiments of the present disclosure are directed to a method and apparatus for tracking and analyzing movements of mobile entities. A variety of operational environments are envisioned for the system.

Some illustrative examples provided below use an operational environment involving a worksite such as an oil drilling rig, an office building, a warehouse, a casino, etc., and the mobile entities tracked include personnel (e.g., workers, visitors, wait staff, etc.), inventory, vehicles, animals, equipment and/or other entities within the operational environment. However, any number of operational environments and types of mobile entities can be used as will be apparent to the skilled artisan in view of the present discussion.

Figure 1:
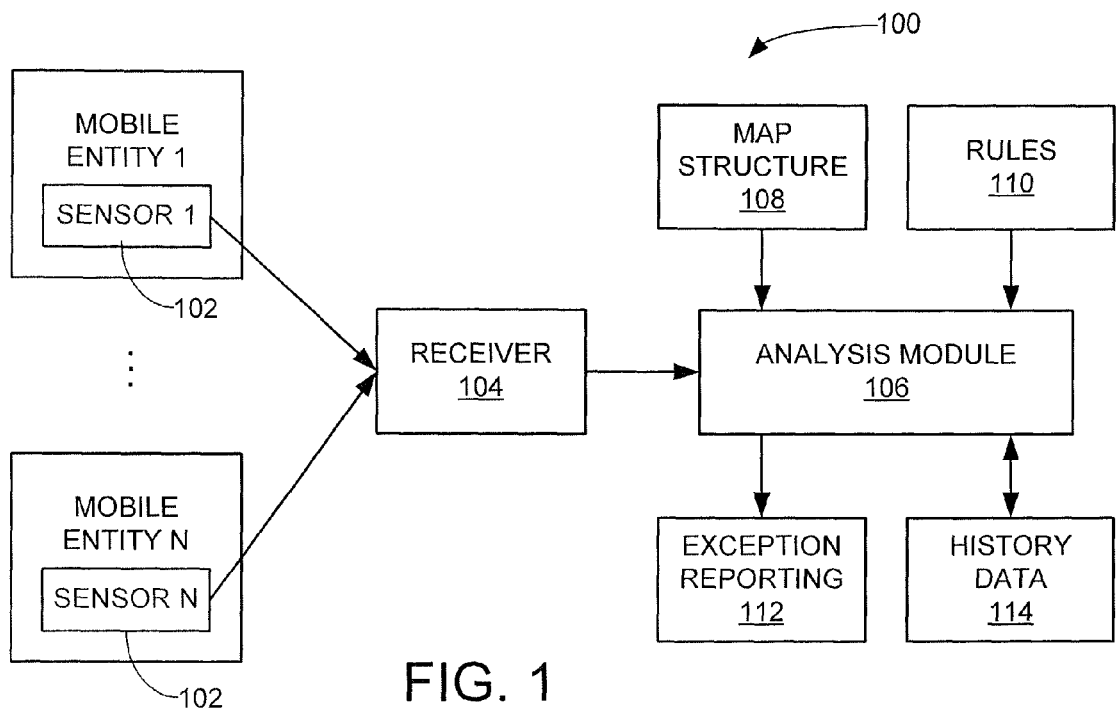
FIG. 1 is a generalized functional block diagram of major components of a mobile entity tracking and analysis system in accordance with various embodiments.

FIG. 1 a functional block diagram for a tracking and analysis system ("system") 100 in accordance with some embodiments. The system 100 incorporates a number of components including sensors 102, receivers 104, an analysis module 106, one or more computerized map structures 108, a rules module/database 110, an exception reporting module 112 and a history data log 114. These various elements can take a variety of forms.

In some cases, the modules 106-114 may be realized in computer hardware and software, including one or more software routines loaded into one or more memories and executed by one or more computer processors. Other aspects of the system, such as application program interfaces (APIs), user interfaces (UIs), communication systems, network connections, additional sensors, alarm systems, lockdown systems, etc. may be incorporated as required but are not shown for brevity of illustration.

In some embodiments, it is contemplated albeit not required that the sensors 102 (denoted as sensors 1-N for corresponding mobile entities 1-N) are portable sensors that are worn by, carried by, affixed to or otherwise associated with the respective mobile entities. It is contemplated in the example diagram of FIG. 1 that the mobile entities represent human personnel (e.g., employees/workers) at a work site, although such is merely exemplary and is not limiting. In some cases, the sensors are radio frequency transponders that periodically transmit geoposition packets to the receiver 104 at various times. The particular organization and use of the packets will be explored more fully below.

The receiver 104 transfers the received geoposition packets, or samples thereof, to the analysis module 106 for processing. As explained below, the analysis module 106 performs a variety of functions such as using the map module 108 to identify respective geophysical zones in which the various mobile entities are determined to be located, applying rules from the rules module 110 based on the respective zones to assess a compliance state, setting alarm limits through the exception reporting module 112 to alert appropriate systems/personnel/entities of particular exception conditions so that corrective action may be taken as required, and the logging of history data using the history log 114.

The analysis module 106 operates in real time to assess the then-existing state of the system. The analysis module 106 also can be configured with post-analysis ("rewind" or "replay") capabilities to evaluate past data collection events and rerun the rules based on new and different zones, rules, conditions, etc. Accordingly, worker safety and compliance can be established, maintained and corrected, new proposed compliance rules can be evaluated prior to implementation based on past performance, worker efficiencies can be evaluated and improved, conformance to regulatory requirements can be affirmatively established, and so on. Other features and benefits of the system will readily occur to the skilled artisan.

Figure 2:
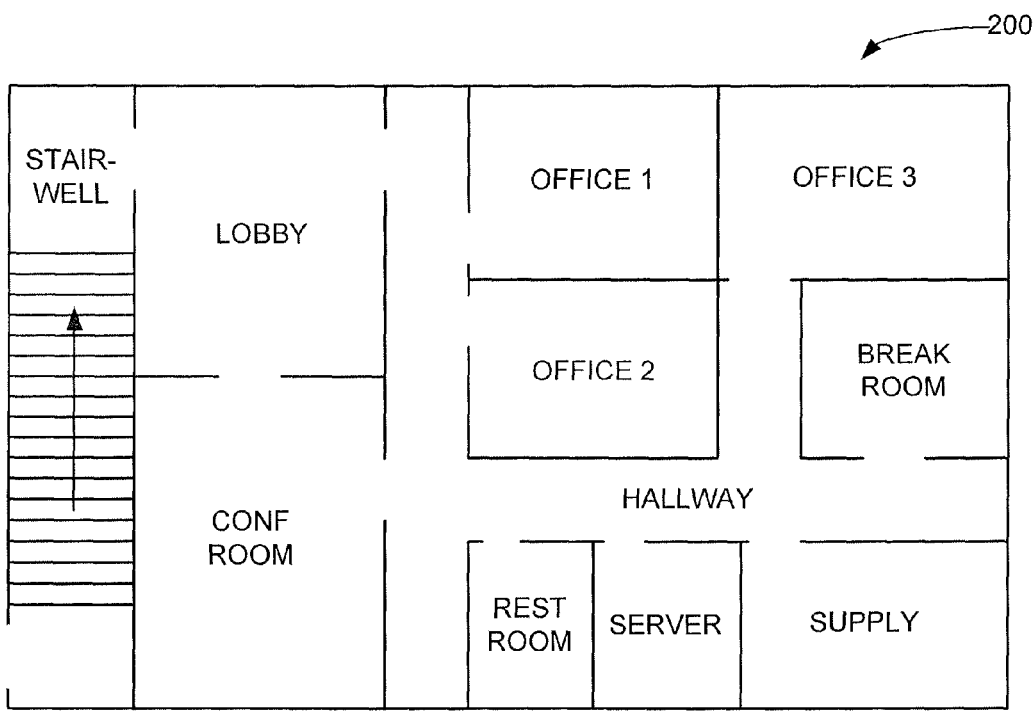
FIG. 2 is a simplified office building layout to provide an exemplary environment for the system of FIG. 1.

FIG. 2 is a schematic representation of an office layout (200) to provide an exemplary operational environment for the system 100 of FIG. 1. It will be understood that the office layout 200 is merely for purposes of illustration to provide one possible type of operational environment for the system of FIG. 1. It will be appreciated that any number of other physical geopositional areas, including within other forms and types of structures as well as outside any such structures (e.g., outdoor areas), can be used. For clarity, the office layout 200 technically comprises a digital representation (map) within the map module 108, but it is contemplated that the map accurately represents an actual (hypothetical) structure in the physical world in which business is conducted by a (hypothetical) commercial enterprise.

The example layout 200 includes a front door, an entry stairwell, a lobby, a conference (conf) room, three offices (offices 1-3), a restroom, a server closet, a supply room, a break room and a hallway. Doorways are denoted by open breaks in the various lines representing walls or other dividers. It is contemplated albeit not necessarily required that doors, including doors that can be activated/deactivated by the system, can be placed in these various doorways. Other openings, such as windows, ledges, railings, pass-throughs, etc. can be similarly modeled and included in the representation but are omitted from the office layout 200 for simplicity of illustration.

Figures 3, 4:
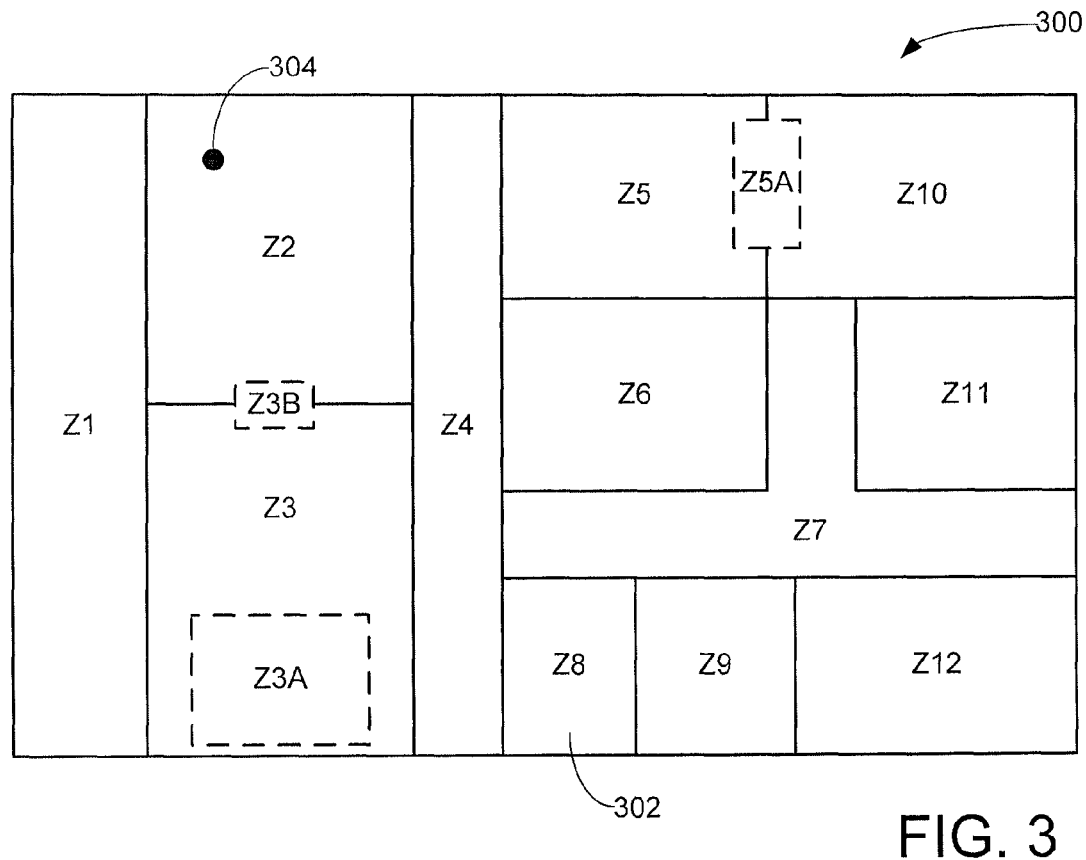
FIG. 3 shows zones defined for the various rooms/areas in FIG. 2.
FIG. 4 is a simplified set of rules for a selected zone from FIG. 3.

FIG. 3 provides a corresponding map structure 300 for the office layout 200 of FIG. 2. The map structure is generated and maintained by the map structure module 108 of FIG. 1 and constitutes a multi-dimensional representation of the physical space represented in FIG. 2. The map 300 is divided into a number of zones 302 which are denoted as zones Z1-Z12. Other zone layouts can be used.

Each of the zones 302 substantially corresponds to an entire "room" from FIG. 2; for example, zone Z3 corresponds to the conference room, zone Z12 is the supply closet, etc. In other embodiments, zones can be formed as a subset of a room. An example of this is zone Z3A, which encompasses a portion of the conference room. Zones can also encompass portions of multiple rooms, such as zone Z5A which covers portions of zones Z5, Z10 and the intervening wall. It will be noted that the hallway from FIG. 2 is broken up into zones Z4 and Z7. As desired, a relatively small, narrow zone can be generated to substantially correspond to a doorway, such as represented by zone Z3B which covers the main doorway from the lobby into the conference room (see FIG. 2). Any number and types of zones can be provided. For reference, the non-overlapping zones depicted in FIG. 3 (e.g., zones Z1-Z12) are characterized as a zone layer (e.g., a "first layer of zones," etc.). The overlapping zones such as zones Z3A, Z3B and Z5A can be characterized as another zone layer (e.g., a "second layer of zones," etc.).

The map structure 300 can be formatted using any number of suitable coordinate-space representational routines and is defined so as to precisely match the physical coordinates of the physical space represented by FIG. 2. The map structure 300 is shown to be two dimensional (apart from the change in elevation provided by the stairway), but other numbers of dimensions can be depicted, such as three dimensions so that length, width and height (elevational) coordinates are specified for each of the zones.

Based on a set of reported coordinates from the sensors 102 (see FIG. 1), the analysis engine 106 can readily determine with a relatively high level of accuracy the zone in which a particular sensor (and correspondingly, the associated mobile entity) is located, as well as the relative location of the mobile entity within that zone. As desired, a user interface (UI) can be generated and displayed to show, in real time, the locations of the various mobile entities by displaying, on a computer or other screen, the map structure 300 and the various locations of the mobile entities.

For example, dot 304 in FIG. 3 represents the location of a selected mobile entity within the lobby (zone Z2). By successively updating the dots over a sequence of position samples, the relative location and movement of the mobile entities can be represented in (at least near) real time. Hence, as the mobile entity moves around the lobby, the corresponding dot 304 will likewise be shown to move to different corresponding locations within the map structure. The refresh rate will determine the amount of "jerkiness" (if any) in the rendered map environment. These and other considerations will be discussed in greater detail below.

FIG. 4 shows a rules data structure 400 in accordance with some embodiments. The rules data structure 400 is generated and maintained by the rules module 110 of FIG. 1, and generally sets forth various rules associated with a given zone. The rules in FIG. 4 are simplified example rules for the conference room, Zone Z3, but it is contemplated that separate rules lists will be maintained for each zone. In some cases, rules applying to all zones (or subgroups of zones) may be accumulated in separate lists.

The rules can take any number of forms and can be established using any suitable criteria. The rules can be omitted, changed, modified or updated at any time. The example rules for the conference room in FIG. 4 include: a maximum number of mobile entities allowed to be present in the conference room at a time (e.g., six, ten, etc.); an access time interval during which a given mobile entity may enter the conference room (such as during normal business hours, etc.); a duration time interval representing a maximum amount of time (continuous or accumulated) that a given mobile entity may remain within the conference room; certification requirements (e.g., certain management level authorizations, safety certifications such as CPR training, etc.) necessary to allow a mobile entity to enter the room; inter-entity distances such as minimum or maximum distances that individual mobile entities can be from one another within the conference room (e.g., no farther than 10 feet; no closer than 1 foot, etc.); and entity movement requirements as minimum or maximum changes in position necessary for mobile entities within the conference room.

At this point it will be understood that the foregoing rules from FIG. 4 are merely exemplary and are not limiting. The actual rules for a given zone will depend on the requirements of the environment. To give a number of non-limiting examples for other zones depicted in FIG. 3, it is contemplated that only information technology (IT) personnel may be authorized to enter the server closet; only individuals of certain genders may be allowed into certain restricted areas such as restrooms; certain service personnel such as janitorial staff may have access to the entire facility but only during off hours; and so on.

The rules can be established based on any number of criteria, and can be updated or changed at any time. In some cases, governmental and/or regulatory specifications and regulations (e.g., OSHA requirements, etc.) can be used to define the appropriate rules for given zones. As explained below, the rules can be subsequently changed and data rerun from the history log "after the fact" for infractions or other system evaluation purposes based on past behavior against newly instituted or proposed rules. Similarly, if an event took place at a certain time that requires investigation, an analysis may include rerunning the locations of the various mobile entities during a time-window around the time of the event to determine actions in the vicinity of the event.

Figures 1, 5:
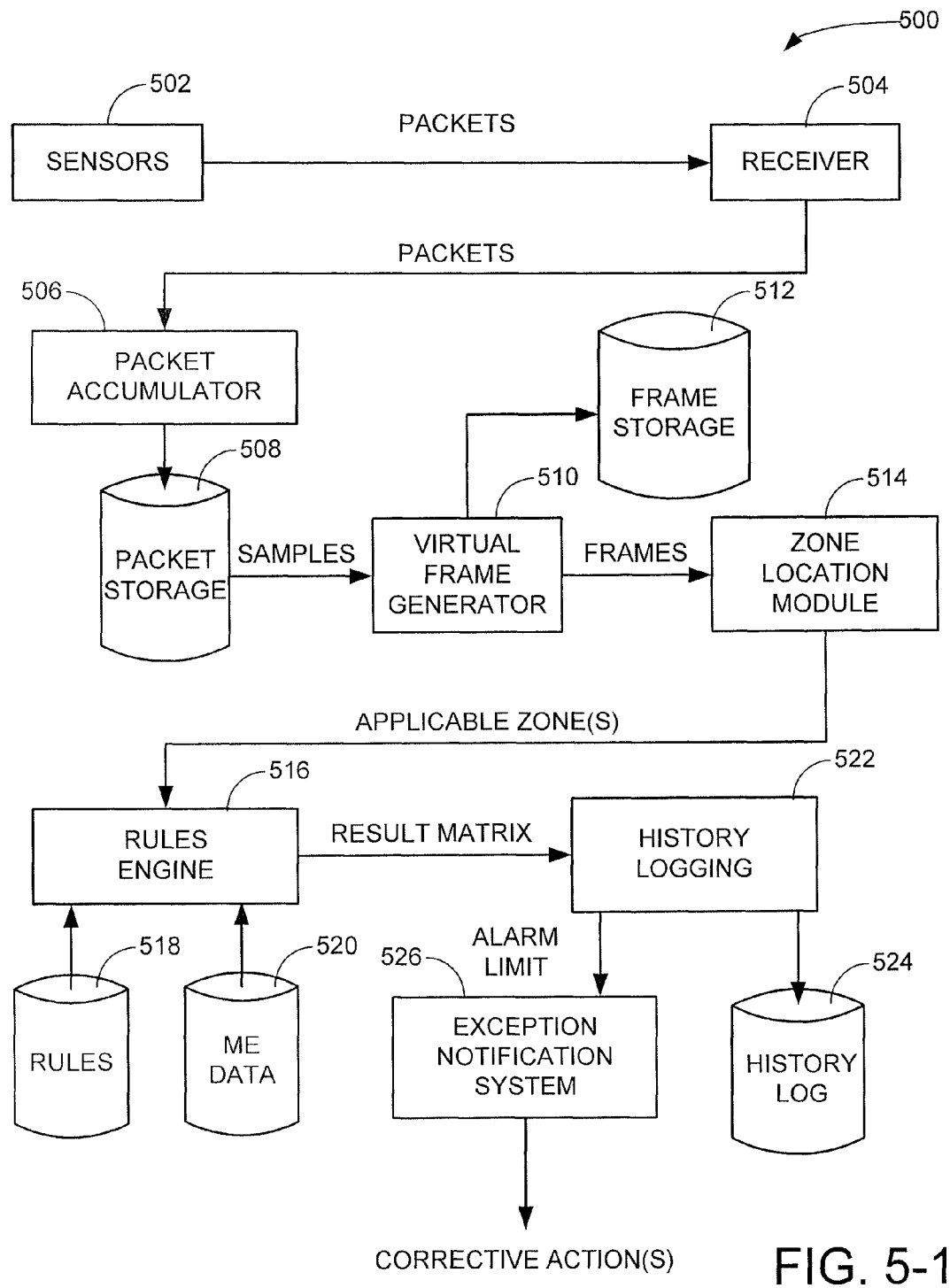
Figures 2, 5:
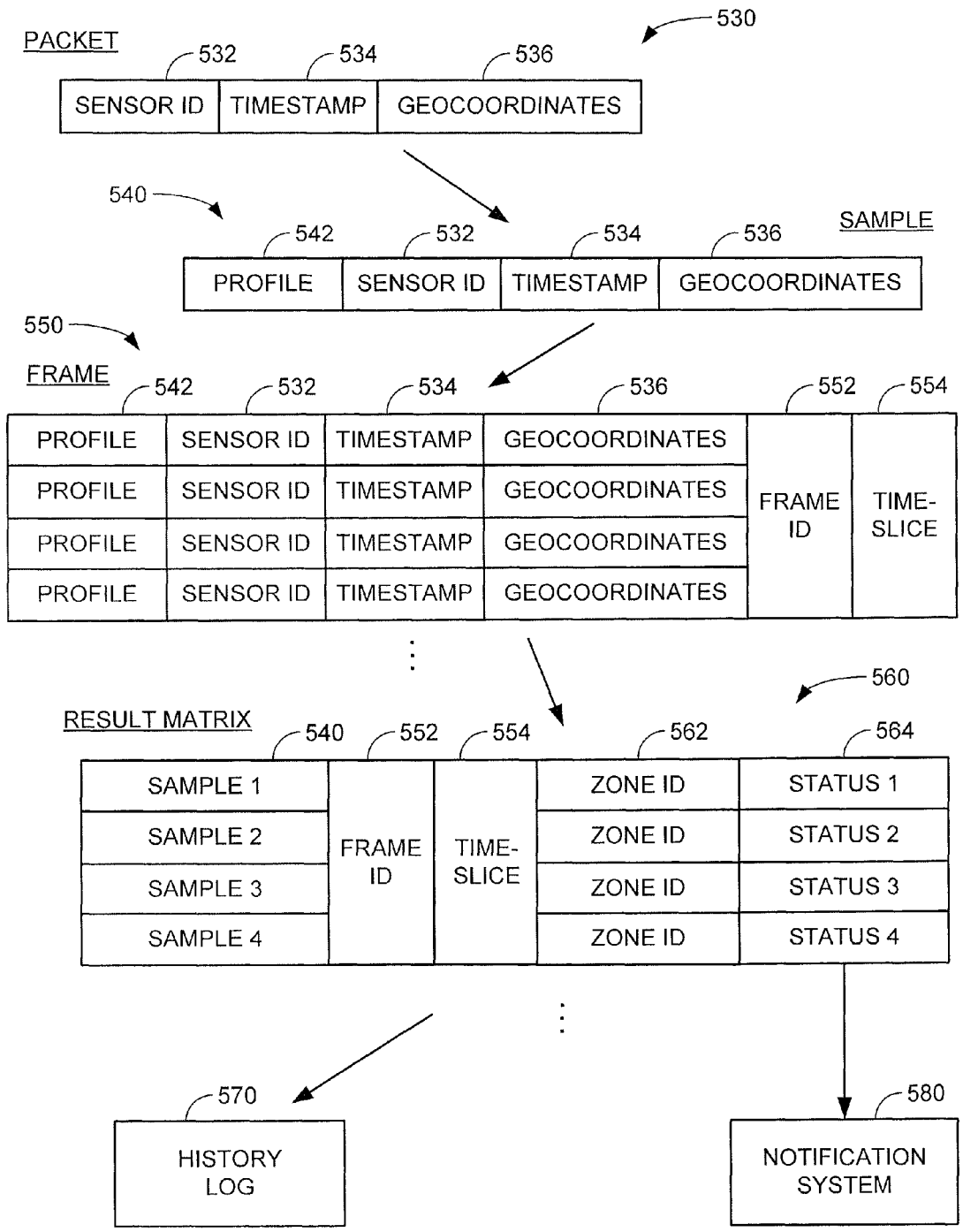

FIG. 5 is a functional block diagram for a tracking and analysis system 500 similar to the system 100 of FIG. 1 to illustrate these and other aspects of the system. Sensors 502 transmit geoposition packets at a selected rate to a receiver 504. In some cases, the packets include a number of data values including a unique identifier (ID) corresponding to the sensor and hence, the corresponding mobile entity, multi-dimensional coordinates such as two-dimensional (2D) or three-dimensional (3D) coordinates from the physical geopositional area at which the sensor was located at the time of transmission of the packet, and a timestamp indication to provide a time point reference for the coordinates. Other formats for the packets can be used as desired.

The rate of transmission for the geoposition packets may be several packets per second, but other transmission rates including higher rates or lower rates can be used depending on the requirements of the environment. In some cases, the transmission rate may be adjusted based on location, in a manner to be discussed below.

In some cases, the sensors 502 are portable RF transponders commercially available from The Q-Track Corporation, Huntsville, Ala., USA under the trademark NFER® (Near Field Electromagnetic Ranging). Such sensors are relatively small and are attachable to individual personnel through the use of a belt clip. Other types and styles of sensors can be used.

The receiver 504 forwards the received packets to a packet accumulator module 506, which processes the packets as required such as via filtering or other routines and stores the packets in a packet storage memory 508. The packets can be accumulated in any suitable fashion such as by sensor, in timestamp order, etc.

It is contemplated that the packet storage memory 508 only stores packets for a relatively short period of time; while all of the raw packets (and/or processed packets) could be separately transferred to longer term storage, it is contemplated that the history log data collection is a more suitable repository for longer term accumulated data. The packet storage memory 508 is thus a shorter term buffer and the initial packets will only be resident for a few seconds or less. In this way, the packet storage memory 508 may be viewed as a first in first out (FIFO) buffer with a relatively small data capacity.

A virtual frame generator 510 pulls samples of packets from the packet storage memory 508 as required. As explained below, all of the packets generated by the sensors may be evaluated, or less than all of the packets generated by the sensors may be evaluated under different operational conditions. Packets may be received at a first rate (e.g., nominally 10 packets per second) whereas samples may be pulled at a different second rate (e.g., 5 samples per second). Other respective rates can be used, so these are merely exemplary.

It will be understood that the sample packets are essentially the same as the received packets, except that the samples are those selected for processing. For example, successive samples that are outside of normal behavior (e.g., exhibiting a large "jump" in location beyond the capabilities of the mobile entity, etc.) may be filtered out (removed) from consideration. In other cases, though, smoothing functions and/or observer/estimator mechanisms can be applied to provide "estimated" samples between "actual" samples, so that it is not necessarily required that every sample evaluated by the system is an actual sample directly generated by the sensors.

The virtual frame generator 510 operates to assemble frames, or collections of sampled packets, at given time references. More specifically, a given frame may represent at least one sample for each of the mobile entities at a particular point in time. It is contemplated albeit not necessarily required that each of the individual sensors 502, while transmitting at (potentially) the same rate, will provide packets at different individual times.

The virtual frame generator 510 assembles each frame as a grouping of samples within consecutive time slices. In one embodiment, at least one packet (sample) from each mobile entity is collected in each frame with the collected packets all falling within a particular time range (e.g., time X+/−some respective intervals, such as 11:15:34.10+30 microseconds and −40 microseconds, etc.). Any suitable ranges can be used to establish the individual frames. It is contemplated that several frames will be generated and evaluated per second, such as but not limited to ten frames per second.

Regardless, once a frame is assembled, the frame may be assigned a unique frame ID and a unique timestamp ID and stored in a frame storage memory 512. As before, the frame storage memory 512 may collect all of the frames evaluated by the system, or may store a running window of the most recently received frames.

The frames are successively forwarded to a zone location module 514 which, for each packet within each frame, identifies the zone in which the associated mobile entity is located. This is carried out as discussed above in FIG. 3, where the geocoordinates for the frame are compared to the map structure 300 to determine, with a reasonable degree of accuracy, the zone(s) in which the respective mobile entities are located. As desired, the actual location within the zones can also be determined and displayed at this time as discussed above in FIG. 3.

A rules engine 516 next takes the information regarding the applicable zones and positions within the zones, as required and applies the associated rules as in FIG. 4 for each of the identified zones. The rules can be supplied to the rules engine 514 from a rules database in memory 518. As discussed above, each of the rules are stepwise applied based on the geocoordinates and zone information. Application of the rules may be dependent solely on the geocoordinates of the appropriate sample, or may require additional information such as mobile entity (ME) data from memory 520.

For example, if a rule requires a certain level of certification in order for a particular mobile entity to be present in a particular location, the ME database from memory 520 can supply the information necessary to ascertain whether the mobile entity has such certification. Other rules can involve calculations of time, distance or other factors, and can involve multiple mobile entities. While it is contemplated that each frame will be evaluated separately, in some embodiments rules governing movement, direction of movement, velocity, acceleration, etc. (e.g., changes of position with respect to time) may involve further analysis steps involving multiple successive frames.

A result matrix data structure is generated by the rules engine 514 for each frame, or succession of frames as required. The result matrices are forwarded to a history logging module 522 which logs the result matrices in long term storage (history log memory 524). In some cases, the data for a given time period, such as a 24 hour period, may be accumulated and uploaded to an offsite memory location (e.g., cloud storage, a remote network, etc.). It is contemplated albeit not required that the history log data are retained for a relatively long period of time, including up to or exceeding a few years in order to maintain a record of the activity identified by the system 500.

As required, the system 500 will identify exceptions in terms of violations of the applicable rules. To give a simple example, one of the rules (such as discussed above in FIG. 4) may be a maximum number of mobile entities permitted in a given zone. If this maximum number/limit is exceeded for a given frame, an exception is identified within the result matrix, such as a flag or other status value. The flag or other status value can take any suitable form such as a multi-bit logical value in an associated field within the result matrix. The flag may also include a code that identifies the particular exception, severity, required corrective action, etc.

The presence of one or more flags/status values indicating a rules violation may result in an alarm limit being declared to an exception notification system 526. As used herein, the term "alarm limit" will be broadly understood as an informational signal that signifies a predetermined threshold has been met (so that an "alarm" is set). The system 526 can take any number of suitable forms. For minor violations (exceptions), a simple comment or note may be generated and provided to the appropriate personnel: for example, a worker found to be outside his/her normal working areas may result in a notification being provided to a supervisor that the worker was at X location at Y time, leaving it up to the supervisor to bring this to the worker's attention at a subsequent meeting. More automated communication systems can be employed such as text messages, emails, phone calls, pages, radio communications, etc. based on the severity level of the violation.

In situations where the violations are more severe, alarms, buzzers, sirens or other audio/visual indicators may be immediately sent to either supervisory personnel and/or the individual worker(s) involved in the violations. For example, if personnel appear to be near a restricted dangerous area, alarms may be automatically generated and sent directly to the personnel to warn them of the dangers they are (perhaps inadvertently) encountering.

It will be noted that the rules established and applied by the rules engine 516 can change based on changing conditions. A dangerous condition such as a fire or leak detected by a sensor or other input may result in a new rule that requires personnel to not be in a certain area. The sensor can rely on information supplied from an outside source; for example, an indication from the National Weather Service (NWS) that lightening strikes have been detected in the area may result in an alert to remove personnel from a tower or other exposed structure.

Regardless of the input, at the next frame evaluation step the rules engine 514 may identify a rules violation that is immediately communicated to personnel in that area, giving them near instantaneous, personalized warning to evacuate the area (or take other corrective actions). These and other features will be discussed more fully below.

The rules, and the corresponding exception reporting, can be established at any suitable level including at the individual mobile entity level, the zone level, at a multi-zone level, at an entire site level, etc. To provide a concrete example, assume one rule requires an individual be certified in CPR (cardiopulmonary resuscitation). At one level, each mobile entity that enters a particular zone may be required to be CPR certified, so that at each frame, each mobile entity in the particular zone can be checked for CPR certification.

In another level, a rule may be established that at least one person in the particular zone is required to have CPR certification. For each frame, each of the samples identifying mobile entities (personnel in this case) in the particular zone would be checked, and if at least one of the mobile entities had CPR certification, no exception would be noted.

At still another level, the rule may check to determine that at least one mobile entity somewhere on the site has CPR certification. These and many other rules can be formulated and enacted as required.

FIG. 5-2 shows data structures utilized by the system 500 of FIG. 5-1 in some embodiments. It will be appreciated that the various data structure formats shown in FIG. 5-2 are merely for purposes of illustration and are not limiting.

An example packet is denoted at 530. As noted above, the packets are output at a regular rate by each of the sensors 502 using a suitable wireless communication protocol. Each packet 530 includes a sensor identification (ID) value field 532, a timestamp field 534 and a geocoordinates field 536. The sensor ID value is unique to each sensor and enables the system to identify the corresponding mobile entity. The timestamp value is a time/date style value indicating the actual or relative time of the packet generation/transmission. The geocoordinates are multi-axial coordinate values expressed in any suitable coordinate system including Cartesian coordinates, polar coordinates, etc. It is contemplated that the geocoordinates, if in the Cartesian space, will be at least two dimensional (e.g., an "x" value and a "y" value) although three dimensional geocoordinates (x, y, z) are also envisioned.

An example sample is denoted at 540. It will be recalled that the samples are selected from the available received packets 530 for processing. In some cases, each sample 540 includes the sensor ID, timestamp and geocoordinate fields 532, 534, 536 (and associated component values) from the associated packet 530, as well as a profile field 542. The profile field 542 may be populated with a profile value indicative of the individual mobile entity described by the sample. In some cases, the profile value may include a type classification (e.g., human, vehicle, machine, robot, etc.) of the mobile entity as well as a unique identifier (Mr. Jones, Ms. Smith, Forklift No. 3, etc.).

A sample frame is shown at 550. As discussed above, each frame 550 is assembled from samples 540, one for each mobile entity, that fall within a particular time range (time slice). In some cases, samples may not be available for every mobile entity in a given frame, so those samples that are available are included within the frame.

The frame 550 in FIG. 5-2 includes the sensor ID, timestamp, geocoordinates and profile fields for each sample, as well as an optional frame identification (ID) field 552 and a time-slice field 554. The frame ID field 552 stores a frame ID value as a unique identifier for the frame. The time-slice field 554 stores a time-slice reference value (in absolute or relative terms) to uniquely identify the time associated with the frame 550.

A result matrix is depicted at 560. As discussed above, the result matrix 560 arises upon processing by the analysis engine (e.g., zone location module, rules engine, etc.) aspects of the system as a result of the zone identification and rules application operations. While not necessarily required, in some cases the results matrix includes aspects of the associated frame 550 (e.g., samples 540, frame ID field 552, time-slice field 554) as well as a zone identification (ID) field 562 indicating the zone in which each sample is located, and a status field 564 providing a status of the rule application processing.

The status value from field 564 can take a variety of forms, as discussed above. In some cases, if no exceptions were noted, the status value may be a null value. If an exception is noted, the status value may be a multi-bit code value corresponding to the style, type, severity or other information relating to the detected exception.

Finally, FIG. 5-2 shows that the result matrices 560 can be stored to a history log 570 database for subsequent processing (as discussed below), and at least the status values (and associated information) are forwarded to a notification system 580 for corrective action and reporting operations as appropriate.

The foregoing discussion presents an overview of the system. Particular aspects and additional features will now be discussed.

Entity Movement Detection

Figure 6:
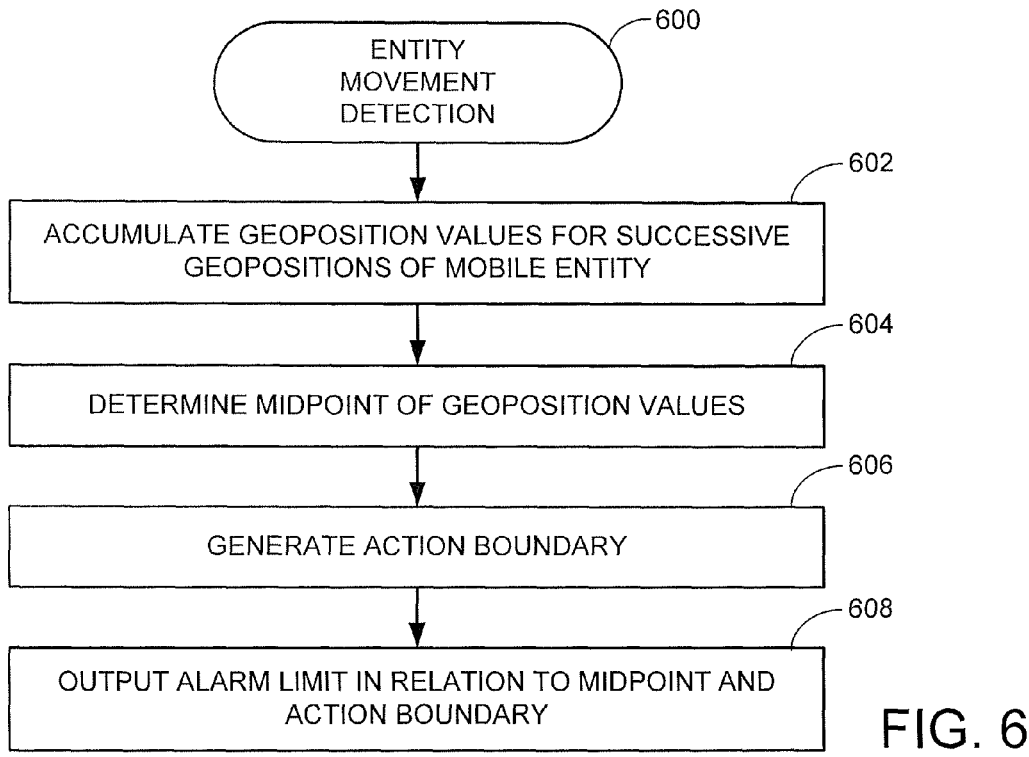
FIG. 6 is a flow chart for an entity movement detection routine.

FIG. 6 is a flow chart for an entity movement detection routine 600 in accordance with some embodiments. The routine 600 represents programming utilized by the system 500 to monitor movement of a given mobile entity relative to the surrounding environment. It is contemplated that the routine operates in conjunction with the other analyses taking place on a recurring basis as described above in FIG. 5.

The amount of movement detected during the operation of the routine 600 will depend on the requirements of a given application. For example, a first location, such as a workstation, may require a worker to remain within a certain proximity of an operational panel or other interactive mechanism. This can be monitored by the system to ensure the worker remains in the required location. In another example, a second location can be a mud pit or a drilling column area where workers generally need to be continually moving to carry out the required tasks. In these respective examples, too much movement in the first location may represent an exception condition while too little movement in the second location may represent an exception condition. The routine 600 thus establishes a framework of movements over a period of time, defines a suitable action boundary and then outputs an alarm limit of the action boundary is crossed.

The routine 600 can further detect incapacity of a worker irrespective of the operational environment, such as the case of a worker overcome by fumes or who has suffered an incapacitating health event (rendered unconscious, etc.). It is contemplated that the routine 600 can also detect removal of the sensor from the mobile entity, such as in the case of an employee detaching the sensor and setting the sensor on a table top in order to escape detection of the employee's location. The routine of FIG. 6 can thus be applied wholesale to all of the monitored mobile entities in the environment, or to only those mobile entities within certain zones (or locations within zones).

The routine 600 can further monitor compliance with certain regulatory requirements on an ongoing basis. For example, a hydration station that supplies fluids such as water and/or electrolytic beverages may be located nearby a work area, and workers may be instructed to visit the hydration station on a regular basis (such as once per hour). Such requirements are common in high temperature environments such as outdoor working locations during the Summer or other high temperature periods. The routine can thus be used to detect the frequency at which a worker visits the station, and notifications can be provided in real time (or at the end of the shift) to the employee to ensure future compliance with the hydration requirement. Other suitable applications for the routine of FIG. 6 will readily occur to the skilled artisan in view of the present disclosure.

The routine 600 commences at step 602 where geoposition values (samples) are accumulated over a given time interval for a selected mobile entity. A geometric midpoint of the accumulated samples is generated at step 604 representing a "center of position" location for the mobile entity based on the accumulated samples. An action boundary is determined at step 606, and then an alarm limit is generated in relation to the relative location of the midpoint to the action boundary at step 608.

While FIG. 6 shows only a single pass through the routine 600, It will be understood that midpoints are successively generated based on a new set of samples such as through the use of a rolling window, and each newly generated midpoint is compared in turn to the action boundary. The action boundary need not necessarily be static, but instead can be recalculated or translated over time as required.

Figure 7:
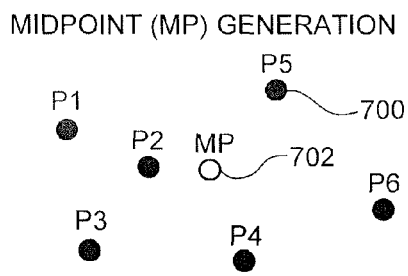
FIG. 7 represents a succession of positions detected over a short period of time during the routine of FIG. 6.

FIG. 7 depicts (in 2D space) a number of samples (dots) 700 corresponding to geoposition samples from step 602 for a given mobile entity. A total of six (6) dots 700 are shown for arbitrarily denoted positions P1 through P6, although any number of position samples can be used, such as ten (10) samples. Filtering can be applied so that positions showing excessive deviation are rejected from the accumulated set. It is contemplated albeit not required that the samples depicted in FIG. 7 were obtained over a relatively short period of time, such as within the extent of a single elapsed second, so that the resolution (distance between dots) is relatively small. However, the samples can instead be selected over a much longer time frame, such as one per second (or more), in which case the relative resolution (distance between dots) is relatively larger.

A midpoint (MP) is represented at 702, and represented by a circle with white interior. The MP constitutes a geometrically derived center of the positions denoted by points P1-P6. Any suitable algorithm can be used to determine the midpoint, including simply averaging the respective coordinates in each axial direction (e.g., x-direction, y-direction, and as required, z-direction in a 3D application). More complex methods can be applied, however, such as weighting more recently obtained with a higher weighting value. Previously generated midpoints can be incorporated into the calculation of a new midpoint.

At this point it will be appreciated that the term "midpoint" generally represents a derived geoposition of the associated entity based on one or more samples, and so a given "midpoint" may not necessarily be surrounded by the samples as represented in FIG. 7. In other words, a midpoint need not necessarily be in the "middle" of a group of samples. For example, an entity traveling along a selected velocity vector may provide a succession of samples that are essentially in a straight line indicative of the velocity and direction taken by the entity. The midpoint values derived to describe the position of the entity may all fall on one side of the midpoint (e.g., "upstream" of the path taken by the entity). Other arrangements are contemplated.

In some cases, each respective midpoint 702 is generated using a rolling window so that accumulated points P1-P10 are used to generate a first midpoint MP 1, accumulated points P2-P11 are used to generate a second midpoint MP 2, and so on. Over time, depending upon the resolution of the system the location of successive midpoints MP 1 . . . MP N should show some amount of variability based on natural movement of the sensor, noise in the system, etc. Even if a worker is sedentary and remains seated at a workstation, it is contemplated that some amount of movement will take place as the worker performs duties at the workstation, and this movement will provide a MP profile with small amounts of variation from one MP value to the next.

Thus, one way to detect a stationary sensor (e.g., one that has been removed by the employee, or a sensor attached to an unconscious or debilitated employee, etc.) is to monitor the positional change from one calculated MP value to the next; if such delta changes are less than a selected threshold, an alarm limit may be sounded and an attempt may be made to contact the employee, emergency personnel may be dispatched to check on the employee, etc.

Figure 8:
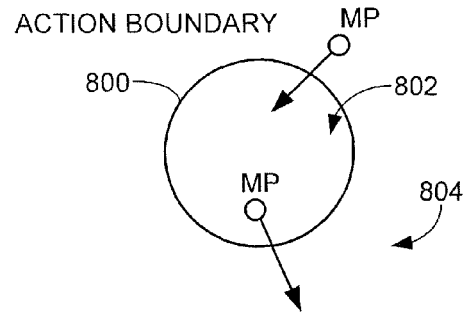
FIG. 8 depicts an action boundary determined in relation to the routine of FIG. 6.

FIG. 8 depicts an action boundary 800 generated during the routine of FIG. 6. The action boundary 800 represents a "fence" along a line in geopositional space adjacent the calculated MP values. The action boundary 800 in FIG. 8 is shown to be circular, but any suitable shapes of the boundary can be used, including non-closed (e.g., segment) shapes.

The boundary 800 separates the zone or other local area into two portions 802, 804, with one of the portions 802 on one side (such as inside) the boundary 800 and the other portion 804 on an opposing side (such as outside) the boundary 800. A three-dimensional volume can be defined using a two-dimensional (surface) action boundary, as desired. Alarm limits are established by a given MP value crossing the associated boundary 800, as shown in FIG. 8.

The action boundary 800 can be derived in relation to the MP values or can be derived independently of the MP values. In the former case, the action boundary 800 may "move" with respect to the location of the MP values (or a combination of previous MP values) such as in the case of a moving window or envelope. Deviations in location such as a sudden acceleration or deceleration or change in direction of the MP could result in the setting of an alarm limit. One possible use of this approach is generating a moving action boundary around a runner or a rider on a horse on a track, etc. Should the runner (or horse) stumble and fall, an immediate alarm limit could be set.

Another example sets the action boundary 800 with respect to another mobile entity. For example, a mobile entity may serve as an escort for a visitor through a facility, and the system rules (which may or may not be communicated to the visitor) require the visitor to remain within a selected distance of the mobile entity (such as 10 feet, etc.).

In this case, the mobile entity (escort) may provide the locus for an action boundary with a radius of five (5) feet. MP values may be calculated using a sensor attached to the visitor, and the routine can then ensure that, as the escort moves through the facility, the visitor remains within the action boundary zone established by the location of the escort.

Stationary action boundaries can be established as well in relation to geophysical features of the environment. An example involving a hydration station was discussed above. It can now be seen that an action boundary can be generated around the hydration station, and the MP values for individual mobile entities (e.g., employees) can be monitored to ensure that the employees move into the inner portion defined by the action boundary on a required scheduled basis.

Other stationary action boundaries can be established. A workstation that requires the employee to remain at a particular location can be surrounded by an action boundary, and excursions out of the inner portion defined by the action boundary can generate alarm limits (which may or may not result in corrective actions, but such excursions will be noted nevertheless). Another work area that requires constant movement may also be defined using an action boundary, and alarm limits may be set if the MP values move into the inner portion defined by the boundary.

Figure 9:
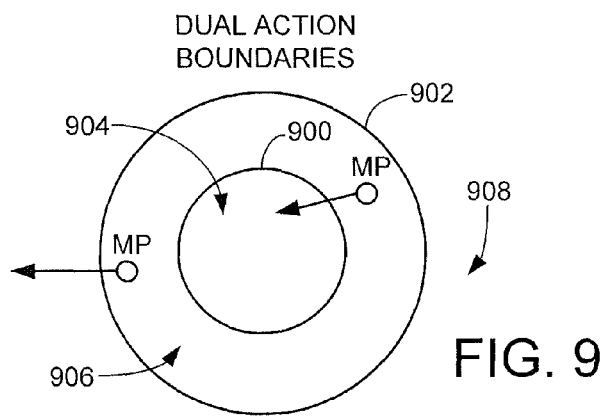
FIG. 9 shows the formation of two (or more) action boundaries.

FIG. 9 illustrates the use of multiple nested action boundaries 900, 902 which divide the zone into three portions 904, 906 and 908. Generally, N non-intersecting action boundaries will tend to divide the associated space into N+1 portions. In some cases, the inner boundary 900 may define a minimum amount of acceptable movement and the outer boundary 902 may define a maximum amount of acceptable movement, so that normal activities are nominally defined to the intermediate portion 906. As before, the boundaries 900, 902 are depicted as circular but this is merely for simplicity of illustration. In some cases, the action boundaries may not necessarily directly map to coordinates in the physical space, but rather are defined in other terms such as changes in MP values from one sample to the next, etc.

In some cases, it can be desirable to determine whether a particular entity has entered a corresponding zone (see e.g., FIG. 3). A number of techniques can be applied, including filtering, to determine whether a given sample indicates entry into that zone. Some techniques can be time-based, such as through accumulating a sufficient number of samples within the zone that indicates the entity is in fact within the zone. A minimum elapsed time interval can be identified so that, should all filtered samples indicate location of the entity within the zone during the course of the elapsed time interval, a decision can be made that the entity is in fact within the zone. The determination could also be time-independent, such as but not limited to accumulating a certain number of filtered samples sufficient to qualify the entity as being within the zone.

In some cases, a zone may have hard (impenetrable) boundaries, such as the conference room (zone 3) depicted in FIGS. 2 and 3. Apart from the respective doorways, it is presumed that the rest of the conference room is defined by masonry walls or other barriers not normally permeable by an entity. Should a succession of samples be obtained from an entity in the conference room at a position adjacent a hard boundary, such as in the lower righthand corner of the conference room in FIG. 3, the occurrence of a sample that shows the entity to be in the hallway (zone 4) on the other side of the hard boundary would likely be an erroneous sample, since the entity would not be expected to be able to "pass through the wall" into the hallway and then back into the conference room during successive sample periods. In this case, other information, such as information relating to the fact that a normally hard boundary separates zones 3 and 4 in this location, could be used during the data processing operation to enable the system to reject stray samples that indicate position in zone 4.

On the other hand, if a soft (penetrable) boundary exists between respective zones, such as no physical boundary at all or a easily permeable boundary (e.g., a low fence, a curb, etc.), then such stray samples that show the crossing of the boundary may not be filtered out, but instead evaluated with a view toward determining whether the entity has crossed, or is lingering adjacent, the boundary between the adjacent zones.

A related issue arises when multiple samples indicate the entity may be straddling two zones, such as in or near a doorway or other soft boundary. Analysis techniques can be used to determine which zone to assign the entity based on other factors; for example, an entity may continue to be assigned to a first zone until sufficient mathematical certainty has been met to assign the entity to the adjoining second zone. Features of the physical layout can be used as part of this determination; for example, if the area between zones is a choke point or other area that may result in the lingering of one or more entities in that area, this information can be used during zone assignment and verification operations.

Dynamic Zone Generation

Figure 10:
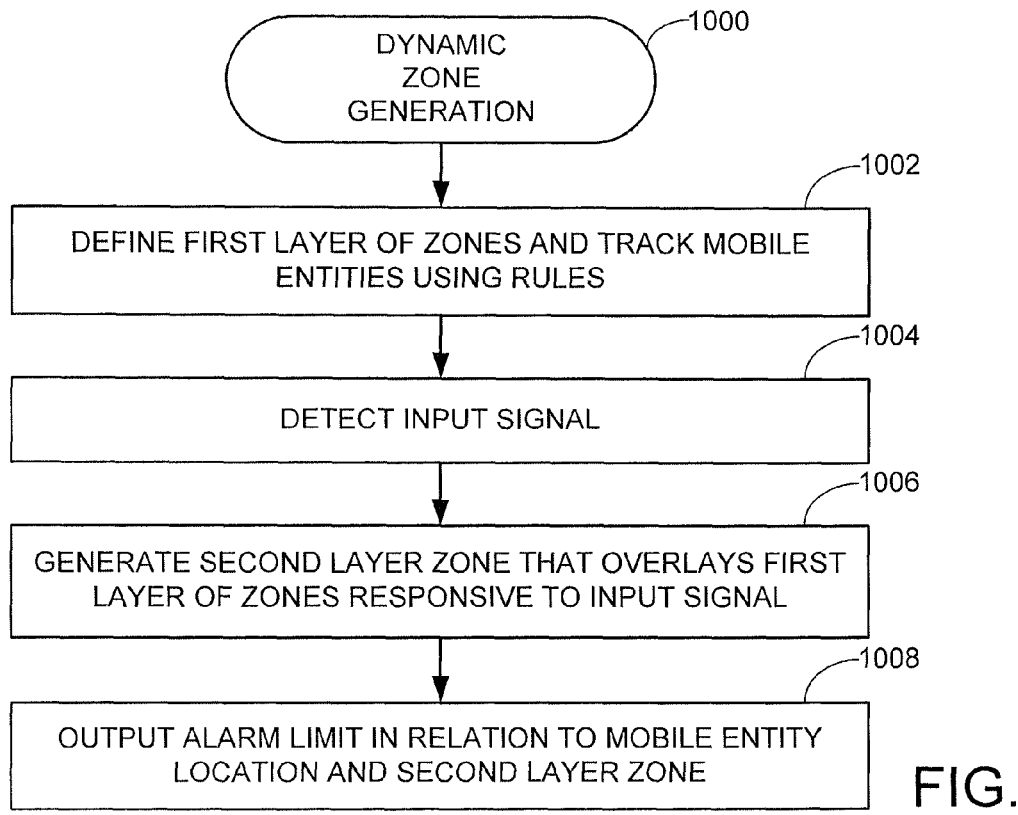
FIG. 10 is a flow diagram for a dynamic zone generation routine.

FIG. 10 provides a flow chart for a dynamic zone generation routine 1000 in accordance with some embodiments. As before, the routine 1000 represents programming utilized by the system 500 (FIG. 5) to monitor movement of mobile entities relative to the surrounding environment, and is executed in conjunction with the other analyses taking place on a recurring basis as described above in FIG. 5.

The analysis of the routine of FIG. 10 is, in some ways, similar to that of FIG. 6, and similar types of tracking operations can be carried out. One difference between the respective routines is that FIG. 10 is generally directed to the generation of an additional layer of zones within the environment. Referring again to FIGS. 2-3, it will be recalled that a geophysical space can be mapped to provide a layer of zones such as zones Z1 through Z12 in FIG. 3. A second layer of zones, such as the zones Z3A, Z3B and/or Z5A, can be subsequently generated and used as required.

Basically, the routine of FIG. 10 operates to sense an input signal that signifies an event within the system has occurred. A second layer of zones is generated (which may be one zone or multiple zones) in response to the input signal, a set of rules is enacted to govern the second layer of zones, and alarm limits are thereafter set responsive to the relative locations of mobile entities and the second layer of zones.

One simple example in which the routine of FIG. 10 may be useful is in the area of restricted access to a particular location. The presence of a fire, a gas leak, possibility of lightening, etc. can establish zones that give rise to a new set of rules to be tested by the system during each frame. Similarly, a motor vehicle or stationary machine may begin operation, giving rise to the generation of new zones in the vicinity of the vehicle/machine.

The second layer of zones can be predefined, such as doorways between adjacent rooms which are activated when mobile entities are sensed to be in the vicinity of the zones, or can be generated as required such as in the case of a detected event (e.g., a fire). The zones can be static in size, can expand and/or can move as required.

The routine 1000 of FIG. 10 begins at step 1002 with a first layer of zones being defined for a geophysical area and the tracking of one or more mobile entities among the first layer of zones as described above in FIG. 5. Upon detection of an input signal, step 1004, one or more second layer zone(s) is generated, step 1006, with the second layer zone(s) overlapping, at least in part, the first layer zones. An alarm limit is thereafter output, step 1008, in relation to one or more of the mobile entities transitioning into or near the second layer zone(s).

Figure 11:
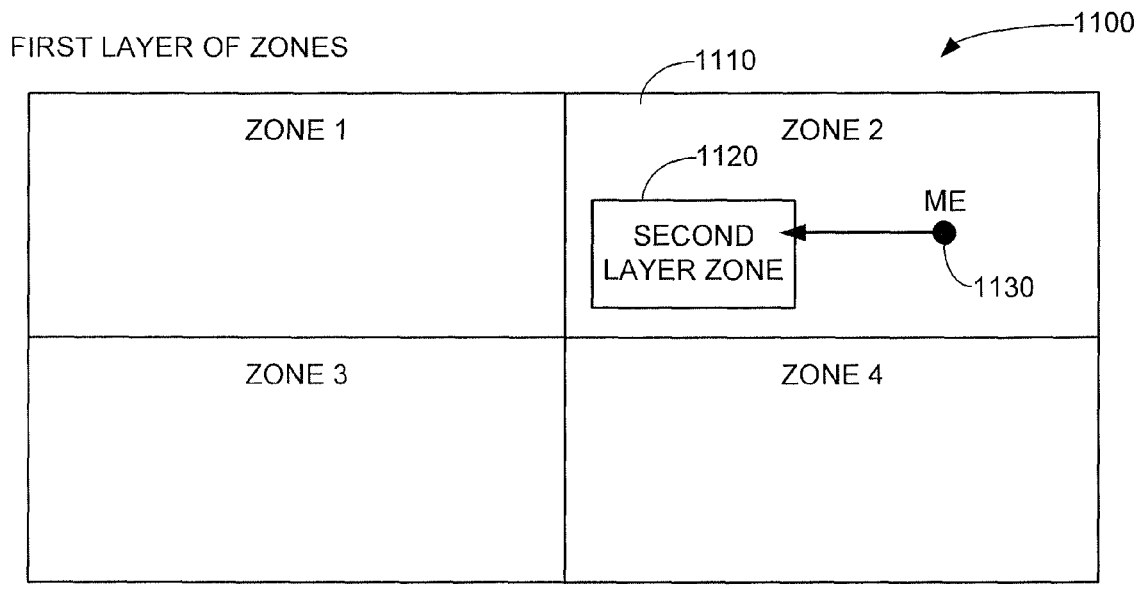
FIG. 11 shows a number of zones used by the routine of FIG. 10.

FIG. 11 shows a simplified map structure 1100 similar to the structure 300 of FIG. 3. The map structure 1100 includes four zones 1110 (zones 1-4). For simplicity of illustration, all of the zones 1110 are rectangular and of the same size, although any number of zones can be provided in the first layer of zones (as established in step 1002).

A second layer zone 1120 is formed responsive to an input signal and overlays zone 2 as shown. Thereafter, a mobile entity (ME), represented by dot 1130, can be tracked, and an alarm limit can be established if the entity moves into the second layer zone 1120. One illustrative example would be a valuable or confidential item or other object with restricted access rules being within the second layer zone 1120. The zone may be activated upon entry of the mobile entity 1130 into zone Z2, or some other event. In this way, processing related to the second layer zone is only enacted when required (e.g., a mobile entity is determined to be nearby, etc.).

Figure 12:
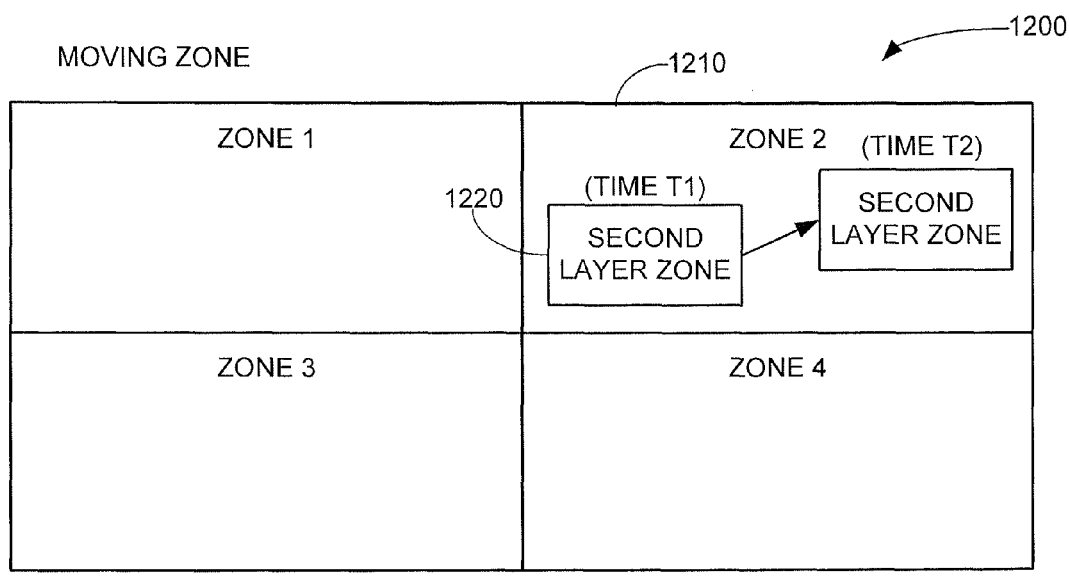
FIG. 12 illustrates a moving zone.

FIG. 12 depicts another map structure 1200 to illustrate a moving second layer zone. The map structure has a first layer of zones 1210 (zones 1-4). A second layer zone 1220 is generated at time T1 based on an input signal, and over time the second layer zone 1220 moves relative to the first layer of zones 1210 so as to be in a different location at time T2.

An example of the moving second zone 1220 in FIG. 12 could relate to the example discussed above in FIG. 11 regarding an escorted visitor. A zone could be formed around a particular mobile entity and move within the map structure 1200 as the mobile entity moves about the facility. Rules such as other mobile entities staying out of the second layer zone, or remaining within the second layer zone, can readily be enacted.

Figure 13:
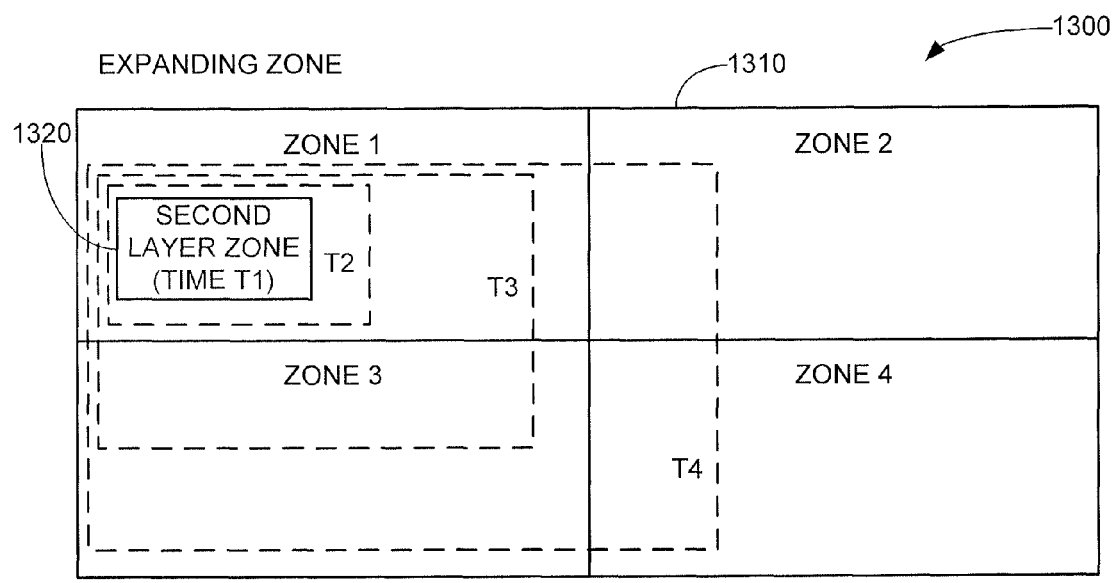
FIG. 13 illustrates an expanding zone.

FIG. 13 shows another map structure 1300 to illustrate an expanding zone. The map structure 1300 incorporates a first layer of zones 1310 (zones 1-4). In response to an input signal, a second layer zone 1320 is formed at time T1, and successively expands to increasingly larger sizes at subsequent times T2, T3 and T4. An example of this latter case may be a fire, a detected leak, etc. As before, rules are generated for the expanding zone so that, for example, mobile entities that are encompassed within the expanding zone are warned to leave immediately, etc. The routine of FIG. 6 can be used to detect an immobile worker within the zone (presumably overcome by fumes, smoke, etc.), allowing emergency personnel to be immediately dispatched.

Figure 14:
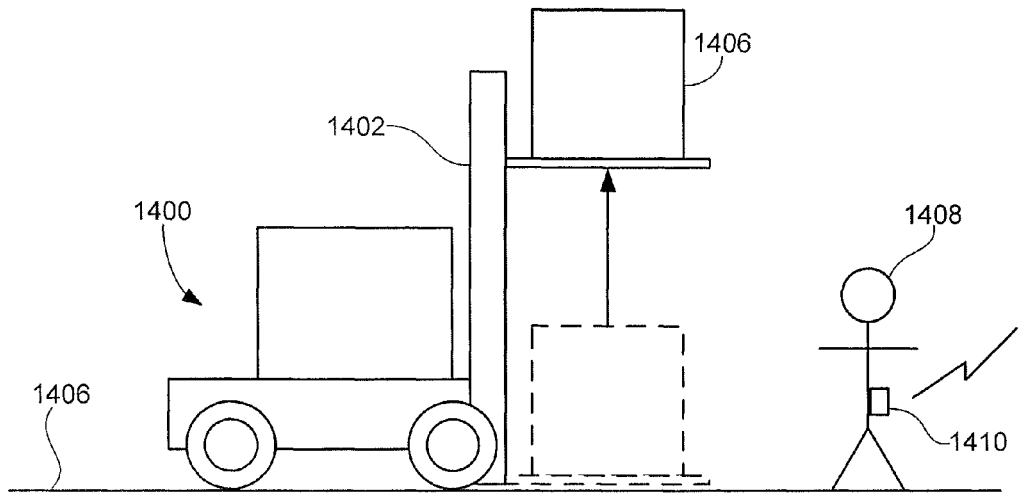
FIG. 14 is a schematic representation of a first mobile entity (forklift vehicle) and a second mobile entity (a human worker).

FIG. 14 is a schematic depiction of a motor vehicle 1400 characterized as a powered lift vehicle (e.g., a forklift). The vehicle 1400 may be automated or operated by a human operator (not separately shown), and is shown to have a front lift mechanism 1402 configured to lift cargo 1404 off of a base (floor) surface 1406:

A nearby mobile entity 1408 carrying a sensor 1410 can be tracked by the routine 1000. As the mobile entity 1408 approaches the vehicle, or vice versa, the mutual proximity of both may trigger an alarm limit. For example, if the lift mechanism 1402 is raised, detection of the mobile entity 1408 under or adjacent the lift mechanism 1402 may cause an immediate disabling of the lift mechanism (and/or the vehicle 1400 itself).

The geoposition of the vehicle 1400 can be tracked using a sensor similar to the sensor 1410 worn by the mobile entity 1408, or other sensing mechanisms can be used. A networked or radio-controlled interface (not separately shown) can be incorporated into the vehicle to allow the system (e.g., 500, FIG. 5) to automatically disable operation of the vehicle based on the proximity of the mobile entity 1408 or other elements within the operational environment.

Figure 15:
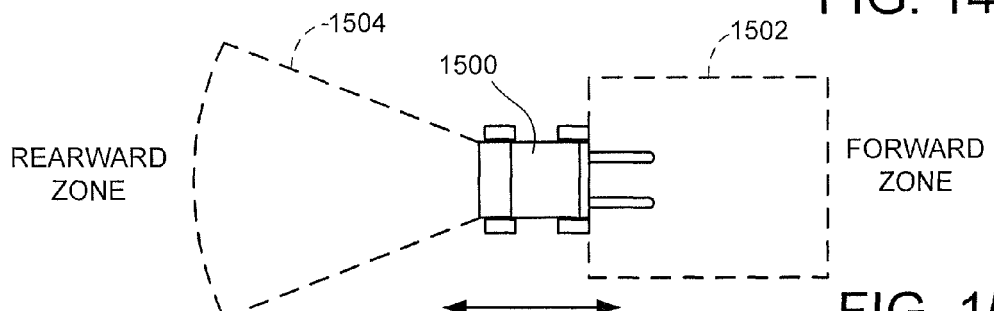
FIG. 15 shows a top view of the forklift vehicle from FIG. 14 to illustrate a number of second layer zones generated during the routine of FIG. 10.

FIG. 15 is a top plan view of another vehicle 1500 similar to the vehicle 1400 in FIG. 4. A forward zone 1502 is a second layer zone that is generated responsive to the detected activation of the vehicle 1500 and movement thereof in a forward direction. A rearward zone 1504 is another second layer zone that is generated responsive to the detected activation of the vehicle 1500 and movement thereof in a rearward direction. The triangular shape of the rearward zone 1504 takes into consideration turning capabilities of the vehicle 1500, but it will be understood that both zones 1502, 1504 can take any suitable shapes depending upon the operational characteristics of the vehicle. It will be appreciated that the respective zones 1502, 1504 move with the vehicle.

The geoposition of the vehicle 1500 can be tracked using a suitable sensor or sensors as discussed above, and the system can deactivate the vehicle automatically based on the incursion of mobile entities (e.g., 1408) within a selected zone 1502, 1504. In some cases, the forward zone 1502 is only activated when the vehicle is in drive (configured to move forward), so that mobile entities may safely pass adjacent the rear of the vehicle 1500. Similarly, the rearward zone 1504 is only activated when the vehicle is in reverse (configured to move backward), so that mobile entities may safely pass adjacent the front of the vehicle.

In further examples, the sizes of the zones change with respect to the speed of the vehicle 1500. This is based on the fact that, generally, the faster the vehicle is moving, the larger the area that should be monitored for other mobile entities (such as the entity 1408 in FIG. 14). Any number of parameters, including position, velocity, acceleration, jerk, nearby features within the geophysical space, etc., can be used to establish and/or modify the second layer zone(s).

Figure 16:
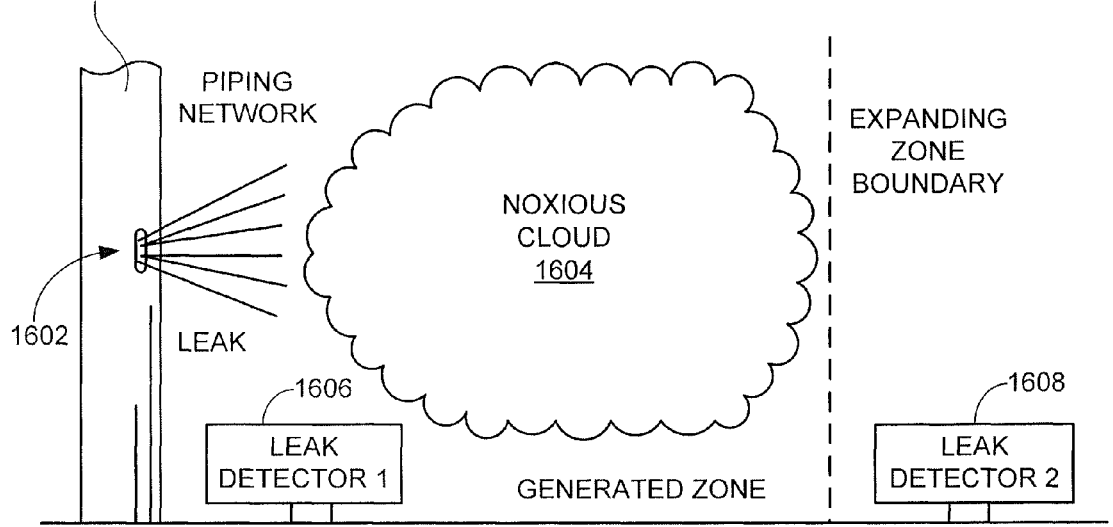
FIG. 16 is a schematic depiction of a piping network to illustrate an expanding zone corresponding to a noxious cloud released from the network.

FIG. 16 depicts a piping network 1600 in a geophysical area mapped as described above. The piping network 1600 carries a noxious fluid (e.g., steam, coolant, etc.) which is shown to be leaking through an opening 1602 in the network, resulting in the formation of a noxious cloud 1604. A first leak detector 1606 detects the cloud 1604 thereby generating a second layer zone (see e.g., FIG. 13). Expansion of the cloud can be mathematically modeled or tracked in real time using additional leak detectors such as 1608. In some cases, the expanding second layer zone is caused to accurately reflect the actual physical size and location of the noxious cloud; in other cases, individual zones or portions thereof are stepwise included into the expanding zone as required.

It will be appreciated that any number and types of sensors, whether local or remote, can be used as part of the sensing process. Airborne particulate and/or contaminant sensors can be used such as sensors configured to detect airborne silica or carbon monoxide. Weather sensors such as temperature sensors, humidity sensors, etc. can indicate unsafe working areas with associated restrictions on personnel access. Noise measuring instruments can similarly identify areas of unacceptable sound pressure or other audible conditions requiring personnel access restrictions or other corrective actions.

Sensor Adjustments

Another feature of at least some embodiments of the present disclosure relates to the ability to adjust the rate at which samples are evaluated by the system. This section will examine adjustments to the transmission rate of the sensors themselves. The next section will examine adjustments to the rate at which the transmitted packets are sampled. Both techniques can be alternatively or concurrently employed as desired under different circumstances, and ultimately operate to change the rate at which samples are evaluated by the system.

Figure 17:
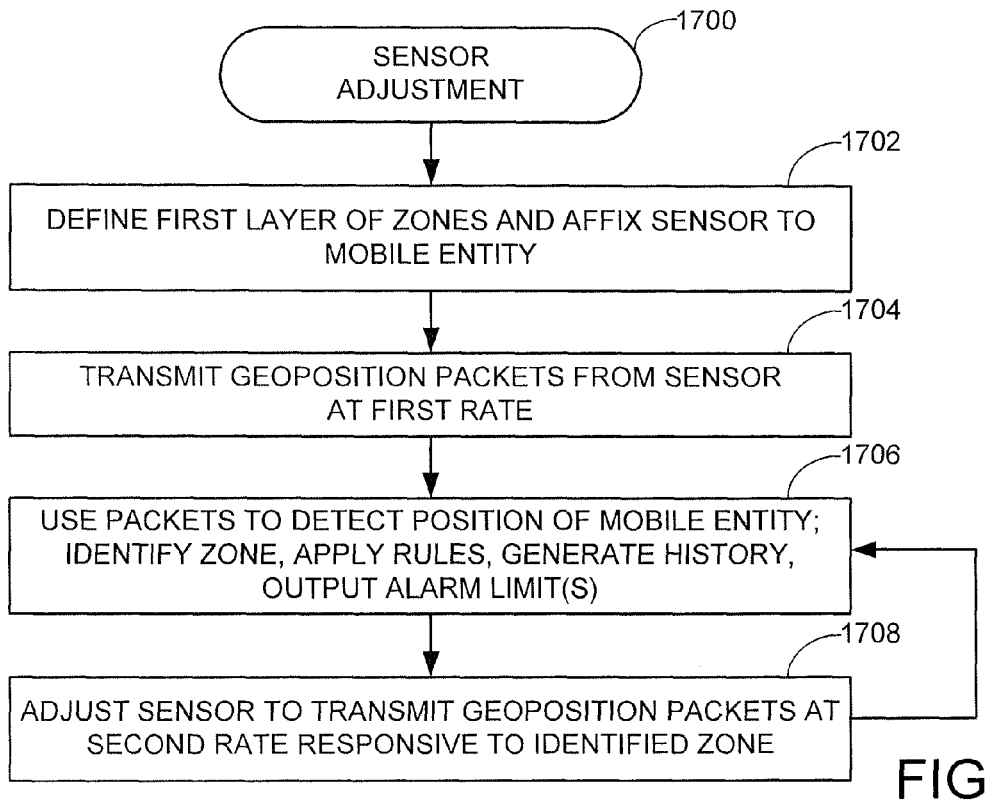
FIG. 17 is a flow chart for a sensor adjustment routine.

FIG. 17 sets forth a sensor adjustment routine 1700 in accordance with some embodiments. As before, the routine represents programming steps carried out by the analysis engine and other aspects of the system 500 in FIG. 5 during normal system operation.

Generally, the routine 1700 detects the relative location(s) of various mobile entities and adjusts the transmission rate of the respective sensors based on location. This can provide a number of benefits including power savings, reduction in system processing and storage requirements, and dedication of resources to more complex and important analysis tasks.

One area in which the routine 1700 may be of value is the differentiation between position and/or time resolution required for different areas. The lobby area of FIG. 2, for example, may be a relatively low priority area, so sensors in this area (zone Z2 in FIG. 3) may be commanded to provide fewer packets per second to the system and/or packets with less precise geopositioning values. On the other hand, the conference room in FIG. 2 (zone Z3 in FIG. 3) may be considered a high priority area, so sensors in this area are commanded to provide more packets per second and/or packets with higher geopositioning precision.

Another area in which the routine 1700 may be of use is in the area of time trials. A track meet event may involve races by runners (mobile entities) along a track at certain times. Prior to a particular race, the system may not require high resolution with regard to the number of packets received from the runners as they circulate around the infield inside the track (which may be defined as a first zone). As the time of the race approaches, however, and/or as the runners approach the track (which may be defined as a second zone), the system increases the rate of packet transmission. In this way, the higher rate of transmission can be established during the race, allowing precise evaluation of the race.

In another example, the relative velocity/speed of a mobile entity (e.g., human, animal, vehicle, etc.) can dictate the rate at which packets are transmitted. Higher velocities and/or speeds, higher rates of acceleration or deceleration, etc. can cause adjustments in the packet transmission rates. In these and other cases, the adjustments of the sensors provide time-varying resolution based on the requirements of the then-existing conditions.

FIG. 17 commences at step 1702 where a first layer of zones is defined and a sensor is affixed to a mobile entity, as in the track meet example discussed above.

Geoposition packets are transmitted by the sensor at a first rate during a first interval of time, step 1704. As shown by step 1706, the transmitted packets are used to detect the position of the mobile entity, identify the associated zone, apply rules, generate a history log and, as necessary, output alarm limits. The first rate of transmission by the sensor may be established by detecting the sensor (and hence, the runner) to be within a first zone (e.g., the infield). A time indication (e.g., more than X minutes prior to the race) may also be used to set the first transmission rate.

At some point during continued processing, the mobile entity (in this example, the runner) will be determined to have entered a second zone (e.g., the track), resulting in an adjustment of the sensor to a second, higher rate, step 1708. As depicted in FIG. 17, subsequent adjustments, both higher and lower, to the transmission rate can thereafter take place based on the location of the sensor, as well as other parameters such as time indications, etc.

Figure 18:
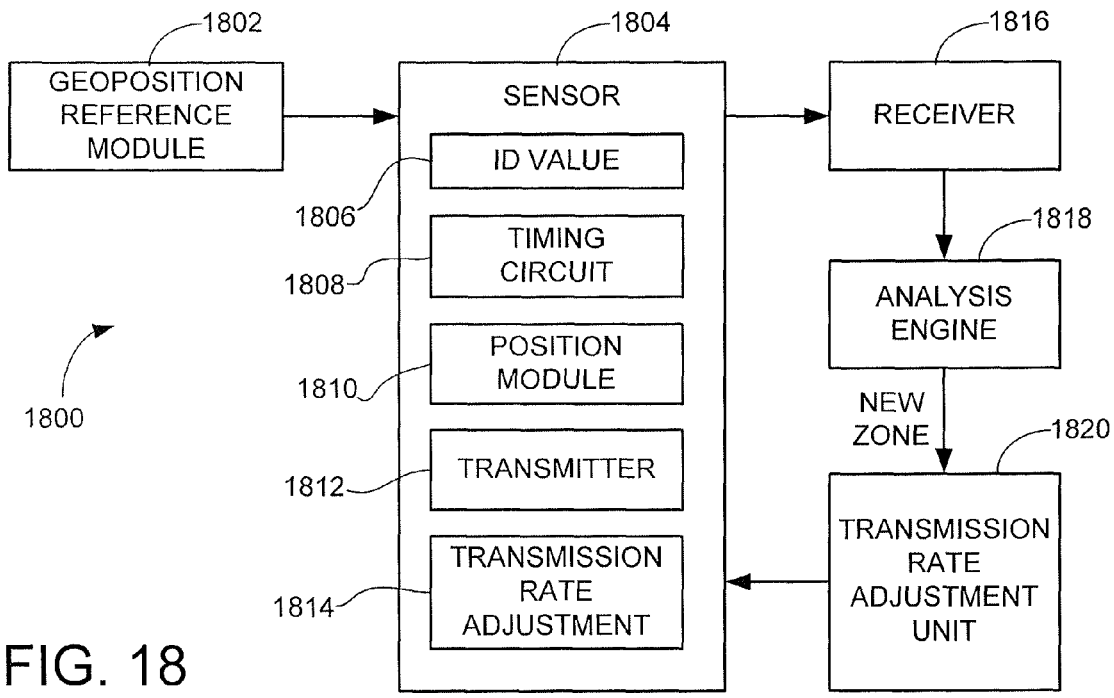
FIG. 18 is a functional block diagram corresponding to the routine of FIG. 17.

FIG. 18 is a functional block diagram of aspects of an adjustment system 1800 that operates in accordance with the routine of FIG. 17. A geoposition reference module 1802, such as a near field electromagnetic transmitter, a GPS system, etc. provides reference signals to a sensor 1804 worn by the associated mobile entity. The sensor 1804 includes a number of modules including an ID value indication module 1806, a timing circuit 1808, a position module 1810, a transmitter 1812 and a transmission rate adjustment circuit 1814.

Generally, the ID value indication module 1806 stores and/or generates a unique identification (ID) value to differentiate the sensor from other sensors that may be operating in the same area. The ID value may be transmitted by the sensor in each packet.

The timing circuit 1808 is a highly precise timer that generates, or reports based on inputs from the geoposition reference module 1802, a time value (time stamp) for each packet. The position module 1810 generally operates to develop, in multi-dimensional space, the instantaneous coordinates of the sensor at each packet time interval. These coordinates are derived responsive to the reference signals from the geoposition reference module 1802. The transmitter 1812 operates to assemble and transmit the packets at a designated rate established by the transmission rate adjustment circuit 1814.

Once transmitted, the packets are received by a receiver 1816 and samples thereof are forwarded to an analysis engine 1818 which operates as discussed above to perform the various analyses of step 1706 (FIG. 17). When the sensor 1804 is determined to have transitioned to a new, different zone, a transmission rate adjustment unit 1820 selects a new transmission rate for the new zone and communicates this to the transmission rate adjustment circuit 1818.

The sensor 1804 is configured with both receiving and transmitting capabilities using suitable wireless transmission protocols. The sensor 1804 is further configured to be able to variably transmit packets over a selected range from a lowest rate to a highest rate. The difference between the lowest and highest rates can vary, and may be on the order of 10×, 20×, 50× or 100× or more (e.g., from one sample per second to 10 samples/sec, 20 samples/sec, 50 samples/sec or 100 samples/sec, etc.).

Sufficient resolution at the timing circuit and position module levels can be provided so that packets can be assembled at these various transmission rates. In some cases, these circuits are configured to continuously generate packets at the highest transmission rate and only those packets required to support the existing rate are transmitted (e.g., if running at $1/10^{th}$ the maximum rate, generally only one out of 10 packets are transmitted). Alternatively, packets may be generated at the specified transmission rate. The reference signals provided from the geoposition reference module 1802 should support the various transmission rates by the sensor 1804.

Sampling Adjustment

Figure 19:
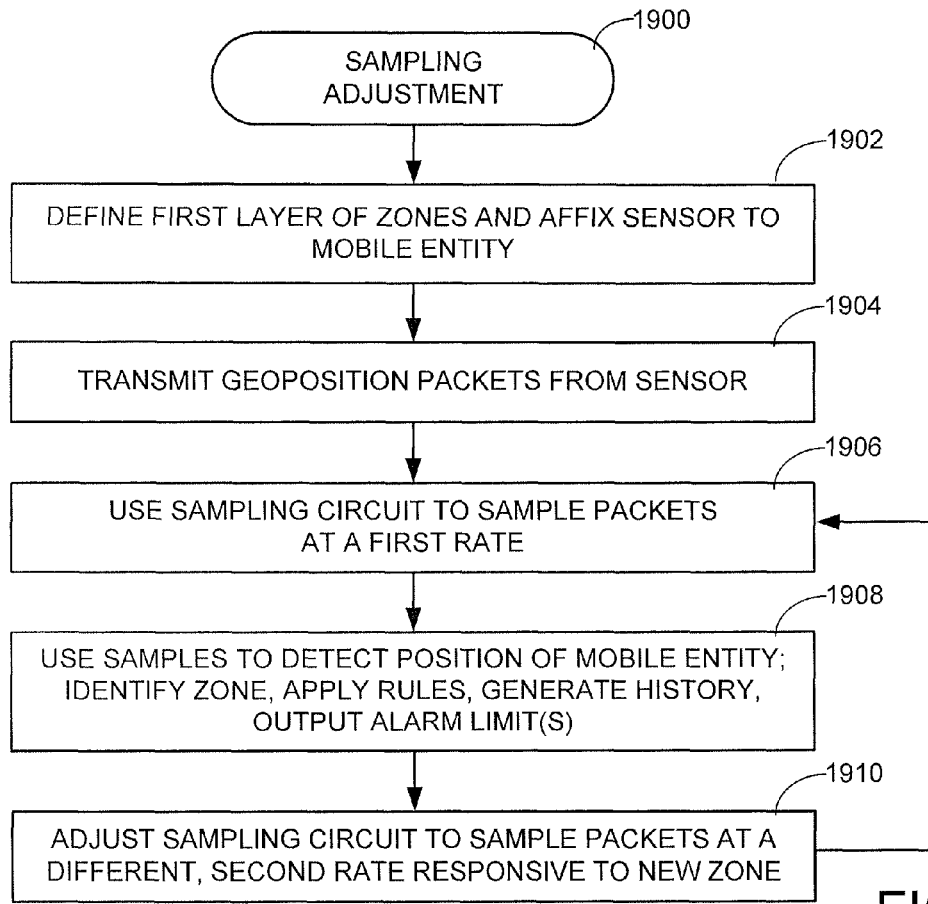
FIG. 19 is a flow chart for a sampling adjustment routine.

A sampling adjustment routine 1900 is shown in FIG. 19. The sampling adjustment routine can operate in lieu of, or in conjunction with, the sensor adjustment routine 1800 of FIG. 18. Generally, the sampling adjustment routine 1900 operates to sense the geoposition of a mobile entity, such as within a selected zone, and then adjusts the sampling rate of the packets transmitted from the sensors based on the sensed geoposition. Thus, the number of received packets per unit time may be held constant, but the number of samples selected from the received packets may vary. Locations requiring relatively higher resolution (greater number of samples) can utilize a higher sampling rate, and locations requiring a lower resolution (fewer number of samples) can utilize a lower sampling rate.

The routine 1900 commences at step 1902 where a first layer of zones is defined and a sensor is affixed to a mobile entity. As before, geoposition packets are transmitted by the sensor at a selected transmission rate, step 1904, and a sampling circuit samples the packets at a first sampling rate, step 1906.

The samples are used as discussed above to detect the position of the sensor (and hence, the mobile entity), to identify the applicable zone, to apply rules thereto, generate a history log and, as required, output alarm limits. These operations are set forth by step 1908, and are successively carried for each set of samples received in turn.

In addition, detection of the zone in which the mobile entity is located, including an existing zone or movement into a new zone, results in an adjustment being applied to the sampling circuit at step 1908 to cause the sampling circuit to thereafter sample the received packets at a second, different sampling rate. In this way, as a given mobile entity moves from one zone to another, different sampling rates may be applied based on the desired resolution.

Figure 20:
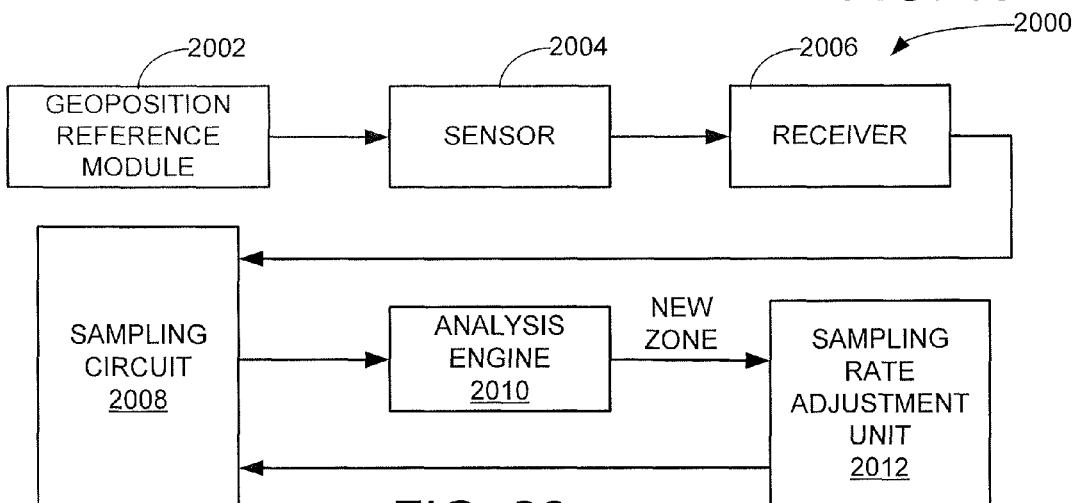
FIG. 20 is a functional block diagram corresponding to the routine of FIG. 19.

FIG. 20 shows a functional block diagram of a system 2000 operable to carry out the routine 1900 of FIG. 19. A geoposition reference module 2002 supplies reference signals to a sensor 2004, which in turn generates and transmits packets to a receiver 2006. The received packets may be buffered in memory as discussed above, but such operation is not expressly depicted in FIG. 20.

A sampling circuit 2008 selects packets for analysis as samples at a selected sampling rate. In some cases, nominally all of the received packets are selected as samples and used for analysis purposes. In other cases, some selected percentage less than 100% of the received packets are selected as samples. It is contemplated that the elapsed time between successive samples will tend to be nominally constant, although some variation may arise due to a number of factors including transmission delays, noise, out-of-threshold packet values, etc.

The selected samples are forwarded to an analysis engine 2010 which operates in a manner similar to the discussion above in FIG. 5. Upon detection of movement of the sensor 2004 to a new zone, a control signal is provided to a sampling rate adjustment unit 2012 which in turn communicates an adjustment signal to the sampling circuit 2008 to change to a different sampling rate. As each new zone is detected, a different sampling rate may be selected and utilized.

Other input signals can be used to adjust the sampling rate, such as detected changes in velocity, the proximity of the mobile entity to another object or entity, a separate event (e.g., a warning alarm, a particular time interval), etc.

History Log Evaluation

Figure 21:
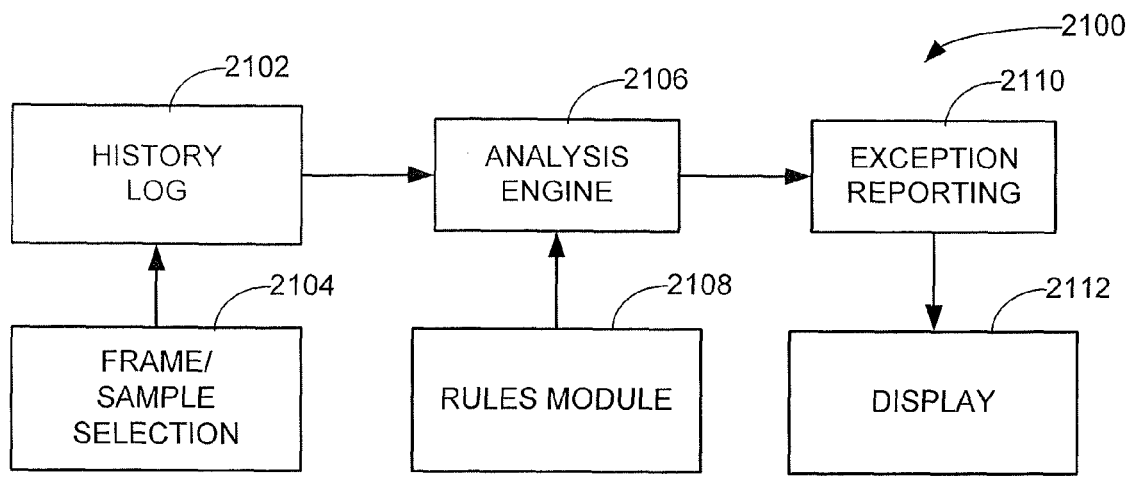
FIG. 21 is a functional block diagram of a tracking system configured for replay operations.

Aspects of the various embodiments relating to the ability to perform post-processing analyses will now be discussed. FIG. 21 shows a functional block representation of aspects of another system 2100 generally similar to the systems discussed above. Generally, the system 2100 is configured to allow any number of subsequent analyses to be evaluated based on accumulated data. The analyses can take a variety of forms.

For example, an event may have occurred at a particular time, or in a particular location (e.g., a selected zone, etc.), and so system administrative personnel may desire to "rerun" the data for the applicable time interval or zone(s). In another example, the behavior of a particular mobile entity (e.g., a particular employee, a particular vehicle, etc.) may wish to be examined over a given time period. In yet another example, new proposed compliance rules may be enacted, and system personnel desire to evaluate what effect, if any, the new compliance rules may have upon previously performed actions.

The system 2100 includes a history log 2102 which maintains past data frames that were previously accumulated during real time monitoring and analysis of the system. These frames, or individual samples, can be selected using a selection block 2104 for subsequent evaluation. All of the data in the system can be evaluated, or only selected frames, selected samples for particular mobile entities, only samples for a particular zone or zone, etc. In some cases, only mobile entities having certain characteristics (e.g., certain certifications, etc.) may be selected for evaluation.

Once selected, the history log forwards the frames, or individual samples, in sequential order to an analysis engine 2106. The analysis engine 2106 operates as described above using rules from a rules module 2108. In some cases, the rules may be proposed rules, modified rules, etc.

The analysis engine provides result matrices to an exception reporting module 2110 which outputs alarm limits, as required, and may also format the result matrices for a recreation animation on a display 2112. The system 2100 can thus recreate a representation of the state of the system in a manner similar to the rewinding of a security tape, etc. except that elements not pertinent to the analysis can be eliminated.

Figure 22:
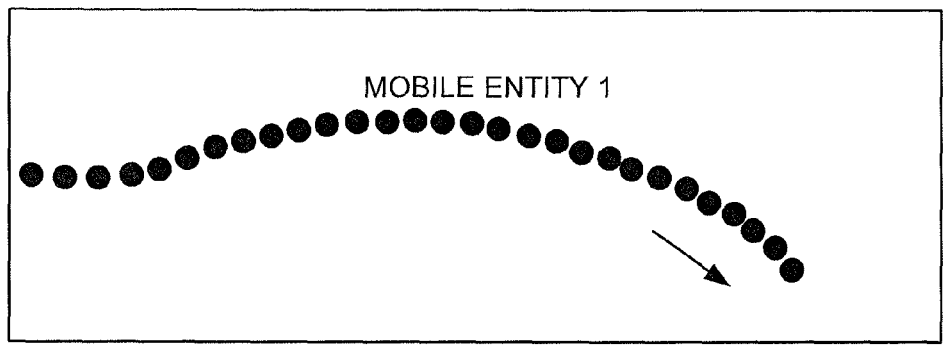
FIG. 22 shows tracking results for a single mobile entity using the tracking system of FIG. 21.

FIG. 22 illustrates a replay representation from the system 2100 for a selected mobile entity 1. All other mobile entities in the system have been omitted, so that the path taken by mobile entity 1 is solely displayed. Time stamp and other information (not separately shown in FIG. 22) can be displayed as required. Analyses such as in FIG. 22 can help track an individual entity within the system.

Figure 23:
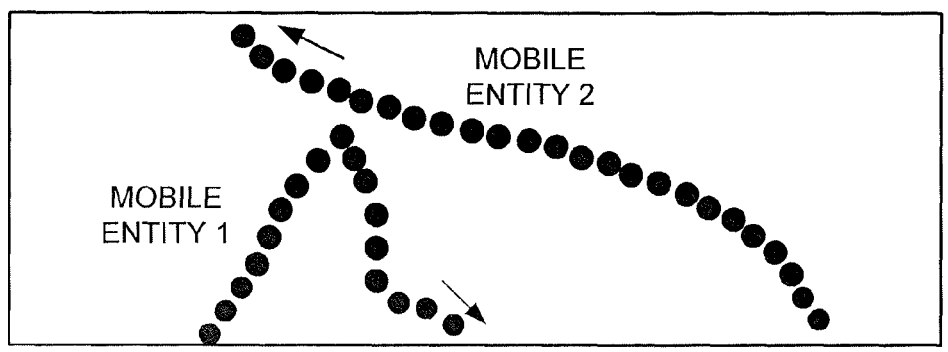
FIG. 23 shows tracking results for multiple mobile entities using the tracking system of FIG. 21.

FIG. 23 illustrates another replay presentation from the system 2100 for a selected zone. As before, other zones and mobile entities not associated with the zone are not included in the playback. As can be seen, two mobile entities (mobile entity 1 and mobile entity 2) each move through the selected zone. This can help to recreate events surrounding an accident or other event requiring investigation. For example, if mobile entity 1 in FIG. 23 is a worker and mobile entity 2 is a vehicle, the replay can determine how close the worker came to crossing the path of the vehicle, and at what time. Corrective actions could be taken including expanding the warning zone around the vehicle (mobile entity 2), enhanced safety training for either or both the worker and the driver of the vehicle, and so on.

The replay capabilities of the system can therefore be utilized in a variety of applications to further enhance safety, security and productivity of the environment.

In some cases, the playback features of the system of 21 can be used for best path analyses in which various mobile entities (personnel, machines, vehicles, robots, etc.) can be evaluated in terms of the most efficient path from a first point (point A) to a second point (point B). Bottlenecks, safety exceptions, interruption events, etc. for a large set of real world data can be replayed, modeled and evaluated to select the most efficient paths for various mobile entities. This can result in certain pathways being developed for individuals to move around a worksite.

In further cases, such best path analyses can be extended to real time monitoring and control. A best path can be calculated for an individual or machine and this best path can be continuously reevaluated and updated based on the other sensed mobile entities (and other environmental factors) in the system. In some cases, a path from point A to point B may be broken up into many intermediate points, and a new best calculated route may be generated at each intermediate point. While individual real time instructions can be communicated to a human worker via a smart phone or other communication device, instructions can similarly be directed to a motorized vehicle (e.g., a forklift), a robot, etc.

Automated Lockout

Figure 24:
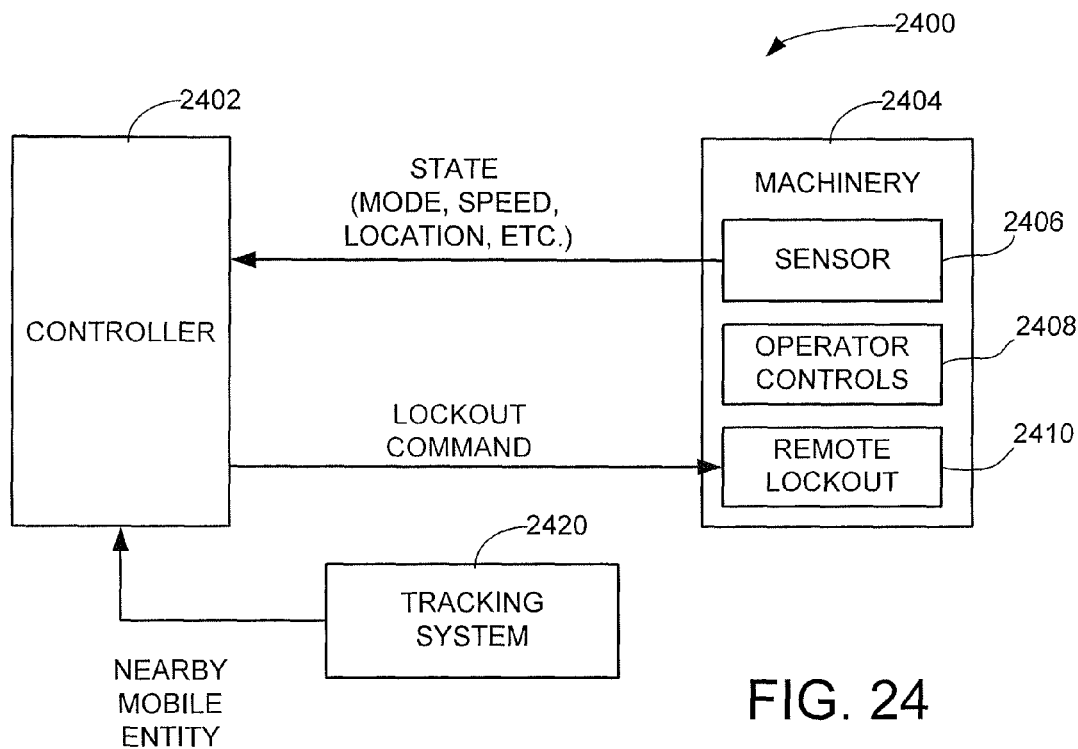
FIG. 24 is another system in accordance with some embodiments to illustrate lockout features that can be incorporated into the tracking and analysis system.

FIG. 24 provides a functional block diagram for a system 2400 similar to those discussed above. The system 2400 shows more details with regard to automated lockout capabilities that can be incorporated in conjunction with the tracking and analysis functions set forth herein.

A controller 2402, in the form of hardware and/or one or more programmable controllers, communicates with remote machinery 2404 via one or more wireless or wire-based communication paths. The machinery can take any number of forms such as a motorized vehicle (such as the forklift discussed above in FIGS. 14-15), or a stationary machine such as any number of different types of industrial machines, tools, mechanisms, etc. In the context of a well site, the machinery could be characterized as a draw works (e.g., a hoist/pulley system utilized to lower and pull piping and other elements in an oil/gas well).

The machinery 2404 includes a variety of elements including one or more sensors 2406, operator controls 2408 and remote lockout circuitry 2410. The sensors 2406 can be in the form of the mobile sensors discussed above (e.g. 502 in FIG. 5, etc.) or can be other forms of sensors. In some cases, the controller 2402 may receive from the sensor(s) various types of state information regarding the state of the machinery including the then-existing operational mode (e.g., on/off; raising v. lowering; extended, retracted; rotational speed, etc.). For mobile machinery, position related information may also be communicated such as location, speed, direction, etc.

The operational controls 2408 serve to allow local personnel (operator) to operate the machine to perform work related tasks. The form of the operational controls will depend on the configuration of the machinery. It will be appreciated that fully automated machinery are envisioned.

A tracking system 2420 such as described above can monitor the various mobile entities within the system (which may or may not include the machinery) and can provide nearby mobile entity information to the controller to signify the presence of one or more mobile entities in the vicinity of the machinery. Based on various operational conditions, the presence of one or more mobile entities (e.g., human personnel) in a location deemed to be dangerous for the then existing state of the machinery may result in the controller 2402 issuing an immediate lockout command to the remote lockout circuit 2410. The remote lockout circuit 2410 operates to immediately, albeit safely, interrupt the then-existing operation of the machinery.

One example was discussed above with regard to a forklift not backing up or lowering its load responsive to a detected nearby worker. Another example might be disabling a conveyor belt or other rotating machinery (e.g., a saw, a lift, etc.) in the presence of personnel. It is contemplated that such reporting and control operations might enhance safety and reduce the possibility of injury to personnel.

Automated Systems

Figure 25:
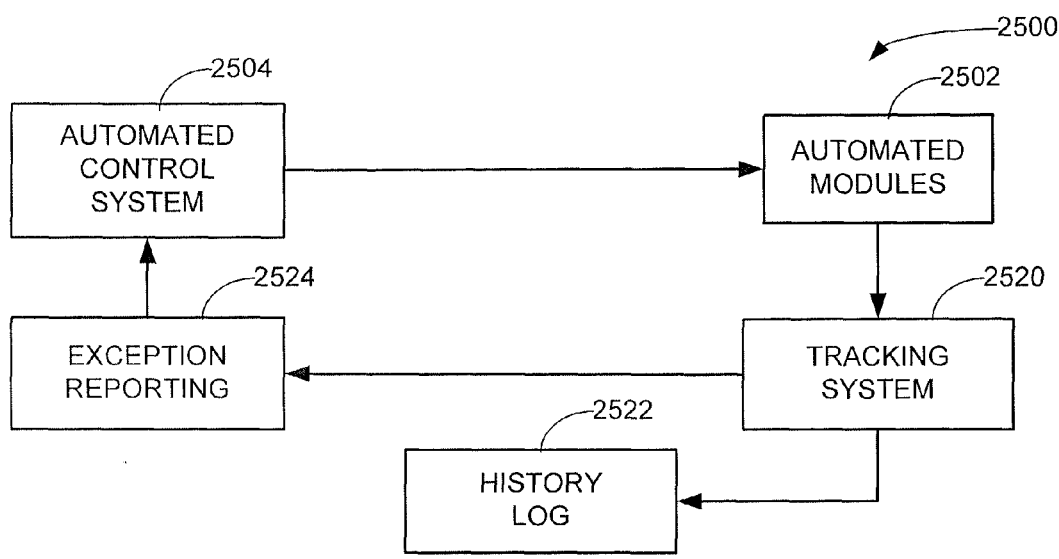
FIG. 25 depicts the use of the tracking and analysis system of various embodiments in a fully automated environment.

Finally, FIG. 25 illustrates another system 2500 in accordance with some embodiments. The system 2500 is a fully automated system in which various aspects of a work site, such as a warehouse or automated factory, operates using a number of automated modules 2502 under the control of an automated control system 2504. It is contemplated that the automated modules may be mobile or stationary, and operate in a closed-loop fashion to carry out various work-related tasks.

In addition, a tracking system 2520 similar to those discussed above monitors certain aspects of the work environment related to the automated modules, including human personnel, vehicles, robots, machines, sensors, etc. and carries out frame-by-frame rules applications, history logging (via log 2522) and exception reporting (via module 2524). The exception reporting system 2524 can provide separate feedback to the automated control system 2504 over and above that provided by the normal control loop, allowing system level analysis, evaluation and improvement.

It will now be appreciated that the various embodiments disclosed herein can provide a number of features and benefits. Real-time tracking of various types of mobile entities can be carried out, with rules-based zone analyses and displays. History log data can be accumulated to maintain a record of actions taken (including compliance with regulatory requirements) and replayed to focus on particular aspects of the system.

What is claimed is:

1. A computer-implemented method comprising:
dividing a multi-dimensional geophysical area into a first layer of zones, each zone encompassing a contiguous portion of the geophysical area and having at least one rule assigned thereto;
accumulating, in a memory, geoposition values from a sensor attached to a mobile entity indicative of successive geopositions of the mobile entity;
for each accumulated geoposition value, identifying the associated zone from the first layer of zones in which the geoposition of the mobile entity is located and applying the at least one rule assigned to the associated zone;
subsequently generating a second layer zone responsive to an input signal, the second layer zone encompassing a contiguous portion of the geophysical area that overlays at least a portion of at least one zone in the first layer of zones, the second layer zone maintaining a constant size and moving over time relative to the geophysical area; and
outputting an alarm limit responsive to a subsequently accumulated geoposition value from the sensor indicating the geoposition of the mobile entity is located within the second layer zone.

2. The method of claim 1, wherein the mobile entity is a human.

3. The method of claim 1, wherein the second layer zone is associated with a motor vehicle and defines a safety zone proximate the vehicle, wherein the alarm limit disables at least one selected operation of the motor vehicle.

4. The method of claim 1, wherein the second layer zone is associated with a second mobile entity and the second layer zone moves relative to the geophysical area responsive to changes in geoposition of the second mobile entity as determined from a second sensor attached to the second mobile entity.

5. The method of claim 1, wherein the at least one rule indicates the mobile entity is not authorized to be in the associated zone, and the method further comprises generating a second alarm limit responsive to the at least one rule.

6. A computer-implemented method comprising:
dividing a multi-dimensional geophysical area into a first layer of zones, each zone encompassing a contiguous portion of the geophysical area and having at least one rule assigned thereto;
accumulating, in a memory, geoposition values indicative of successive geopositions of a mobile entity within a selected zone over a selected time interval;
for each accumulated geoposition value, identifying the associated zone from the first layer of zones in which the geoposition of the mobile entity is located and applying the at least one rule assigned to the associated zone;
using a processing engine to determine a midpoint of the geoposition values;
generating an action boundary proximate the midpoint to partition the zone into first and second portions separated by the action boundary;
locating the midpoint relative to the action boundary; and
outputting an alarm limit responsive to the midpoint falling within the first portion.

7. The method of claim 6, wherein the first portion is an inner portion within the action boundary and the second portion is an outer portion outside the action boundary.

8. The method of claim 6, wherein the first portion is an outer portion outside the action boundary and the second portion is an inner portion inside the action boundary.

9. The method of claim 6, wherein the action boundary is a first action boundary and the method further comprises generating a second action boundary which surrounds the first action boundary and outputting a second alarm limit responsive to the midpoint falling outside the second action boundary.

10. The method of claim 6, wherein geopositioning values outside a filtering threshold boundary are discarded and not used to generate the midpoint.

11. The method of claim 6, wherein the mobile entity is a human.

12. The method of claim 6, wherein the mobile entity is a motorized vehicle.

13. The method of claim 6, wherein the mobile entity is a non-human animal.

14. The method of claim 6, further comprising:
generating a second layer zone responsive to an input signal, the second layer zone encompassing a contiguous portion of the geophysical area that overlays at least a portion of at least one zone in the first layer of zones; and
outputting an alarm limit responsive to a subsequently accumulated geoposition value from the sensor indicating the geoposition of the mobile entity is located within the second layer zone.

15. An apparatus comprising:
a plurality of sensors each attached to a respective mobile entity within a geophysical area;
a receiver which receives a sequence of geoposition packets from each of the respective sensors indicative of instantaneous geoposition of the associated mobile entity, each packet comprising a set of geocoordinates and an associated timestamp indicative of a time at which the mobile entity was at said set of geocoordinates;
a mapping engine which defines, in a computer memory, a first layer of zones each corresponding to a different contiguous portion of the geophysical area, the mapping engine further defining at least one rule associated with the mobile entities for each zone;
a sampling engine which receives the transmitted packets from the receiver and generates an asynchronous frame as a set of received packets having timestamps within a selected time interval; and
a rules application engine which, for each frame, identifies the associated zone in which each of the mobile entities is located, applies the associated rules for the associated frames, and sets an alarm limit value in a memory responsive to a violation of at least one of the rules.

16. The apparatus of claim 15, wherein the mapping engine subsequently generates a second layer zone responsive to an input signal, the second layer zone encompassing a contiguous portion of the geophysical area that overlays at least a portion of at least one zone in the first layer of zones, and wherein the rules application engine outputs an alarm limit responsive to a subsequently accumulated geoposition value from the sensor indicating the geoposition of the mobile entity is located within the second layer zone.

17. The apparatus of claim 16, wherein the second layer zone is stationary relative to the geophysical area.

18. The apparatus of claim 16, wherein the second layer zone expands over time relative to the geophysical area.

19. The apparatus of claim 16, wherein the second layer zone maintains a constant size and moves over time relative to the geophysical area.

20. The apparatus of claim 15, further comprising a tracking engine which accumulates, in a memory, geoposition values indicative of successive geopositions of a selected mobile entity within a selected zone over a selected time interval, wherein the tracking engine determines a midpoint of the geoposition values, generates an action boundary proximate the midpoint to partition the selected zone into first and second portions separated by the action boundary, locates the midpoint relative to the action boundary, and outputs a second alarm limit to the memory responsive to the midpoint falling within the first portion.

21. The apparatus of claim 20, wherein the tracking engine applies a filtering threshold boundary and discards geopositioning values outside the filtering threshold boundary so that the discarded geopositioning values are not used to generate the midpoint.

22. The apparatus of claim 15, wherein the mobile entity is a human.

23. The apparatus of claim 15, wherein the mobile entity is a motorized vehicle.

24. The apparatus of claim 15, wherein the mobile entity is a non-human animal.

25. The apparatus of claim 15, wherein the sensors transmit the geoposition packets to the receiver at a first rate, and wherein a selected sensor is adjusted to transmit the geoposition packets to the receiver at a different, second rate responsive to the rules application engine identifying the associated mobile entity being located within a first zone.

26. The apparatus of claim 15, wherein the sensors transmit the geoposition packets to the receiver at a first rate, the sampling engine samples the geopositioning packets transmitted to the receiver at a second rate less than or equal to the first rate, and responsive to the geopositioning packets indicating a selected sensor is in a selected zone, the sampling engine samples the geopositioning packets transmitted to the receiver for the selected sensor at a different third rate less than or equal to the first rate.

27. A computer-implemented method comprising:
dividing a multi-dimensional geophysical area into a first layer of zones, each zone encompassing a contiguous portion of the geophysical area and having at least one rule assigned thereto;
accumulating, in a memory, geoposition values from a first sensor attached to a first mobile entity indicative of successive geopositions of the first mobile entity;
for each accumulated geoposition value, identifying the associated zone from the first layer of zones in which the geoposition of the first mobile entity is located and applying the at least one rule assigned to the associated zone;
subsequently generating a second layer zone responsive to an input signal, the second layer zone encompassing a contiguous portion of the geophysical area that overlays at least a portion of at least one zone in the first layer of zones, wherein the second layer zone is associated with a second mobile entity and the second layer zone moves relative to the geophysical area responsive to changes in geoposition of the second mobile entity as determined from a second sensor attached to the second mobile entity; and
outputting an alarm limit responsive to a subsequently accumulated geoposition value from the first sensor or the second sensor indicating the geoposition of the corresponding first mobile entity or second mobile entity has crossed a boundary associated with the second layer zone.

28. The method of claim 27, wherein the first mobile entity and the second mobile entity are each a human.

29. The method of claim 27, wherein a selected one of the first mobile entity or the second mobile entity is a human and the remaining one of the first mobile entity or the second mobile entity is a non-human animal.

30. The method of claim 27, wherein the second layer zone is associated with a motor vehicle and defines a safety zone proximate the vehicle, wherein the alarm limit disables at least one selected operation of the motor vehicle.

* * * * *

UNITED STATES PATENT AND TRADEMARK OFFICE
CERTIFICATE OF CORRECTION

PATENT NO. : 9,070,275 B1  
APPLICATION NO. : 14/526198  
DATED : June 30, 2015  
INVENTOR(S) : Shannon D. Green and Tyler DeWitt Page 1 of 1

It is certified that error appears in the above-identified patent and that said Letters Patent is hereby corrected as shown below:

In the Title Page:

Add item (73) Assignee:
"Arsite Technologies LLC, Tulsa, OK (US)"

Signed and Sealed this
Twenty-sixth Day of April, 2016

Michelle K. Lee
*Director of the United States Patent and Trademark Office*